(12) United States Patent
Shimogawa

(10) Patent No.: US 10,838,757 B2
(45) Date of Patent: Nov. 17, 2020

(54) MANAGEMENT APPARATUS AND INFORMATION PROCESSING SYSTEM

(71) Applicant: FUJITSU LIMITED, Kawasaki (JP)

(72) Inventor: Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 16/177,487

(22) Filed: Nov. 1, 2018

(65) Prior Publication Data

US 2019/0138338 A1    May 9, 2019

(30) Foreign Application Priority Data

Nov. 6, 2017  (JP) ................. 2017-213713

(51) Int. Cl.
  *G06F 9/455*  (2018.01)
  *G06F 9/48*  (2006.01)
  (Continued)

(52) U.S. Cl.
  CPC ............ *G06F 9/45558* (2013.01); *G06F 8/60* (2013.01); *G06F 9/455* (2013.01);
  (Continued)

(58) Field of Classification Search
  CPC .. G06F 9/455; G06F 9/45533; G06F 9/45558; G06F 2009/45562; G06F 2009/4557; G06F 9/48; G06F 9/4843; G06F 9/4862; G06F 9/4868; G06F 9/50; G06F 9/5005; G06F 9/5061; G06F 9/5083; G06F 9/4806; G06F 9/4881
  See application file for complete search history.

(56) References Cited

U.S. PATENT DOCUMENTS

| | | | |
|---|---|---|---|
| 2011/0161491 A1* | 6/2011 | Sekiguchi | G06F 9/4856 709/224 |
| 2013/0275961 A1* | 10/2013 | Anderson | G06F 9/5072 717/177 |

(Continued)

FOREIGN PATENT DOCUMENTS

| | | |
|---|---|---|
| JP | 2011-138184 | 7/2011 |
| JP | 2014-191378 | 10/2014 |

(Continued)

*Primary Examiner* — Charles M Swift
(74) *Attorney, Agent, or Firm* — Fujitsu Patent Center

(57) ABSTRACT

A management apparatus includes a processor that identifies a predicted time point of starting scaling-out in an information processing apparatus in which at least one virtual machine operates, based on history data of auto-scaling executed by the information processing apparatus. The processor identifies a required time of deployment executed by the information processing apparatus based on data of a past start time and a past end time of the deployment. The deployment is a process of preparing a virtual machine in the information processing apparatus. The processor determines a next start time of starting the deployment by the information processing apparatus based on the identified predicted time and the identified required time. The processor transmits at the next start time, to the information processing apparatus, a first request for starting the deployment by the information processing apparatus.

8 Claims, 31 Drawing Sheets

(51) Int. Cl.
 *G06F 9/50* (2006.01)
 *G06F 8/60* (2018.01)
(52) U.S. Cl.
 CPC ............ *G06F 9/45533* (2013.01); *G06F 9/48* (2013.01); *G06F 9/4806* (2013.01); *G06F 9/4843* (2013.01); *G06F 9/4881* (2013.01); *G06F 9/50* (2013.01); *G06F 9/5038* (2013.01); *G06F 9/5083* (2013.01); *G06F 2009/4557* (2013.01); *G06F 2009/45583* (2013.01)

(56) References Cited

U.S. PATENT DOCUMENTS

| | | | | |
|---|---|---|---|---|
| 2015/0007178 | A1* | 1/2015 | Kaneko | G06F 9/5088 |
| | | | | 718/1 |
| 2015/0095909 | A1* | 4/2015 | Li | G06F 9/45558 |
| | | | | 718/1 |
| 2015/0134831 | A1 | 5/2015 | Hiroishi | |
| 2015/0278061 | A1* | 10/2015 | Siciliano | G06F 11/3034 |
| | | | | 702/186 |
| 2016/0366246 | A1* | 12/2016 | Battle | H04L 67/22 |
| 2017/0075732 | A1 | 3/2017 | Itoh et al. | |
| 2019/0102213 | A1* | 4/2019 | Yousaf | G06F 11/3006 |

FOREIGN PATENT DOCUMENTS

| | | |
|---|---|---|
| JP | 2015-95149 | 5/2015 |
| WO | 2015/133125 | 9/2015 |

* cited by examiner

FIG. 6

| USER | GROUP |
|------|-------|
| U1   | G1    |
| U2   | G2    |
| U3   | G3    |
| ⋮    | ⋮     |

FIG. 7

| GROUP | MAXIMUM NUMBER OF VMs |
|---|---|
| G1 | 4 |
| G2 | 3 |
| G3 | 6 |
| ⋮ | ⋮ |

FIG. 10

| TIME | CPU LOAD |
|---|---|
| ⋮ | ⋮ |
| 10:15:00 | 40% |
| 10:15:10 | 50% |
| 10:15:20 | 54% |
| ⋮ | ⋮ |

FIG. 11

| NUMBER | STATE | START TIME | END TIME | DURATION | SCALING-OUT / SCALING-IN |
|---|---|---|---|---|---|
| 0 | 1VM | 1:00:00 | 2:00:00 | 1:00:00 | |
| 1 | 2VMs | 2:00:00 | 2:30:00 | 0:30:00 | SCALING-OUT |
| 2 | 3VMs | 2:30:00 | 2:45:00 | 0:15:00 | SCALING-OUT |
| 3 | 4VMs | 2:45:00 | 3:05:00 | 0:20:00 | SCALING-OUT |
| 4 | 3VMs | 3:05:00 | 3:10:00 | 0:05:00 | SCALING-IN |
| 5 | 2VMs | 3:10:00 | 3:15:00 | 0:05:00 | SCALING-IN |
| 6 | 3VMs | 3:15:00 | 3:25:00 | 0:10:00 | SCALING-OUT |
| 7 | 4VMs | 3:25:00 | 3:45:00 | 0:20:00 | SCALING-OUT |
| 8 | 3VMs | 3:45:00 | 3:55:00 | 0:10:00 | SCALING-IN |
| 9 | 2VMs | 3:55:00 | 4:05:00 | 0:10:00 | SCALING-IN |
| 10 | 1VM | 4:05:00 | | | SCALING-IN |

FIG. 13

| NUMBER OF VMs DEPLOYED IN ADVANCE |
|---|
| 2 |

FIG. 15

| NUMBER OF DEPLOYMENTS | TOTAL DEPLOYMENT TIME | AVERAGE DEPLOYMENT TIME |
|---|---|---|
| 5 | 0:55:00 | 0:11:00 |

FIG. 16

| STATE | TOTAL DURATION | NUMBER OF INSTANCES | AVERAGE DURATION |
|---|---|---|---|
| 2VMs | 0:05:00 | 1 | 0:05:00 |
| 3VMs | 0:00:00 | 0 | 0:00:00 |
| 4VMs | 0:00:00 | 0 | 0:00:00 |
| 5VMs | 0:00:00 | 0 | 0:00:00 |

FIG. 17

| STATE | TOTAL DURATION | NUMBER OF INSTANCES | AVERAGE DURATION |
|---|---|---|---|
| 2VMs | 0:30:00 | 1 | 0:30:00 |
| 3VMs | 0:25:00 | 2 | 0:12:30 |
| 4VMs | 0:40:00 | 2 | 0:20:00 |
| 5VMs | 0:00:00 | 0 | 0:00:00 |

FIG. 26

| NUMBER OF EXECUTIONS OF DEPLOYMENT BY PRE-DEPLOYMENT PROCESS |
|---|
| 3 |

FIG. 28

| NUMBER OF DELETIONS OF VM DEPLOYED BY PRE-DEPLOYMENT PROCESS |
|---|
| 1 |

FIG. 29

| USER | GROUP | IMAGE FILE |
|------|-------|------------|
| U1   | G11   | I11        |
|      | G12   | I12        |
| U2   | G21   | I21        |
|      | G22   | I22        |
| ⋮    | ⋮     | ⋮          |

FIG. 30

| IMAGE FILE | NUMBER OF DEPLOYMENTS | TOTAL DEPLOYMENT TIME | AVERAGE DEPLOYMENT TIME |
|---|---|---|---|
| I11 | 5 | 0:55:00 | 0:11:00 |
| I12 | 2 | 1:00:00 | 0:30:00 |
| I21 | 10 | 1:30:00 | 0:09:00 |
| I22 | 3 | 0:09:00 | 0:03:00 |

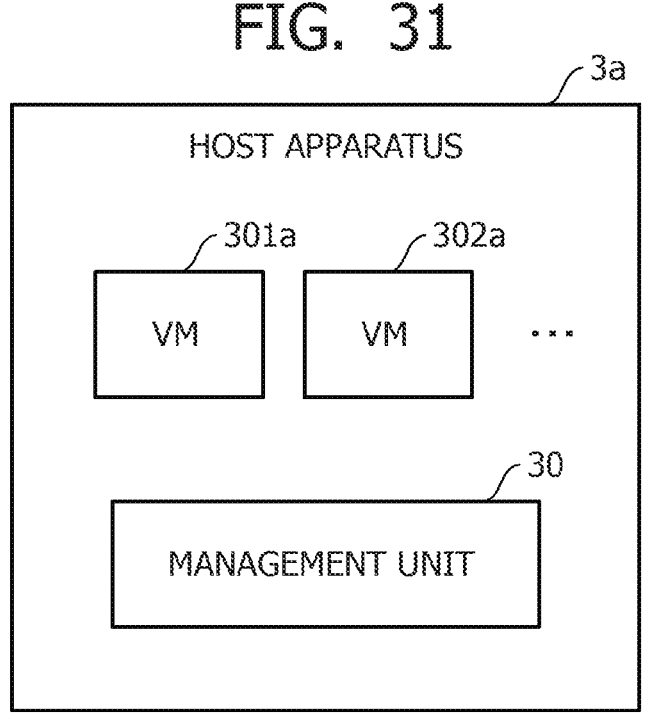

MANAGEMENT APPARATUS AND INFORMATION PROCESSING SYSTEM

CROSS-REFERENCE TO RELATED APPLICATION

This application is based upon and claims the benefit of priority of the prior Japanese Patent Application No. 2017-213713, filed on Nov. 6, 2017, the entire contents of which are incorporated herein by reference.

FIELD

The embodiments discussed herein are related to a management apparatus and an information processing system.

BACKGROUND

Virtual machines operate in a system constructed on a cloud, and a user of a cloud service uses the virtual machines for a business or personal use. In such a system, auto-scaling is executed depending on the situation of use by the user. The auto-scaling is a technique of increasing and decreasing the virtual machines depending on the load on the virtual machines.

For example, the number of virtual machines is increased to reduce the degradation of processing performance when the load on the virtual machines exceeds a threshold due to an increase in the amount of processes of the virtual machines. This is called scaling-out. On the other hand, the number of virtual machines is decreased to reduce the amount of resources used in the system when, for example, the load on the virtual machines is below a threshold. This is called scaling-in.

The scaling-out is a process of operating a new virtual machine. In preparation for the scaling-out, execution of a process of installing the new virtual machine is required (hereinafter, referred to as deployment). The scaling-out is completed by starting the operation of the new virtual machine after the deployment. The deployment includes a process of writing an image file of the virtual machine to a physical disk device, and there is a problem that completion of the scaling-out takes time due to the deployment. The completion of scaling-out with time-consuming deployment causes the state of the load on the virtual machines exceeding the threshold to undesirably continue for a long time.

Related techniques are disclosed in, for example, International Publication Pamphlet No. WO 2015/133125.

SUMMARY

According to an aspect of the present invention, provide is a management apparatus including a memory and a processor coupled to the memory. The processor is configured to identify a predicted time point of starting scaling-out in an information processing apparatus in which at least one virtual machine operates, based on history data of auto-scaling executed by the information processing apparatus. The scaling-out is a process of increasing a number of the at least one virtual machine. The auto-scaling includes the scaling-out and scaling-in. The scaling-in is a process of decreasing the number of the at least one virtual machine. The processor is configured to identify a required time of deployment executed by the information processing apparatus based on data of a past start time and a past end time of the deployment. The deployment is a process of preparing a virtual machine in the information processing apparatus. The processor is configured to determine a next start time of starting the deployment by the information processing apparatus based on the identified predicted time and the identified required time. The processor is configured to transmit at the next start time, to the information processing apparatus, a first request for starting the deployment by the information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in a group data storage unit;

FIG. 7 is a diagram illustrating an example of data stored in a group data storage unit;

FIG. 10 is a diagram illustrating an example of data stored in a load data storage unit;

FIG. 11 is a diagram illustrating an example of data stored in an auto-scaling history storage unit;

FIG. 13 is a diagram illustrating an exemplary data format of a number n of VMs deployed in advance;

FIG. 15 is a diagram illustrating an example of data stored in a deployment data storage unit;

FIG. 16 is a diagram illustrating an example of data stored in a second duration storage unit;

FIG. 17 is a diagram illustrating an example of data stored in a first duration storage unit;

FIG. 26 is a diagram illustrating an exemplary data format of a number N of executions of deployment by a pre-deployment process;

FIG. 28 is a diagram illustrating an exemplary data format of a number M of deletions of VMs deployed by a pre-deployment process;

FIG. 29 is a diagram illustrating an example of data stored in a group data storage unit;

FIG. 30 is a diagram illustrating an example of data stored in a deployment data storage unit in a third embodiment; and FIG. 31 is a diagram illustrating an exemplary functional configuration of a host apparatus in a fourth embodiment.

DESCRIPTION OF EMBODIMENTS

Embodiments will be described.

Figure 1:
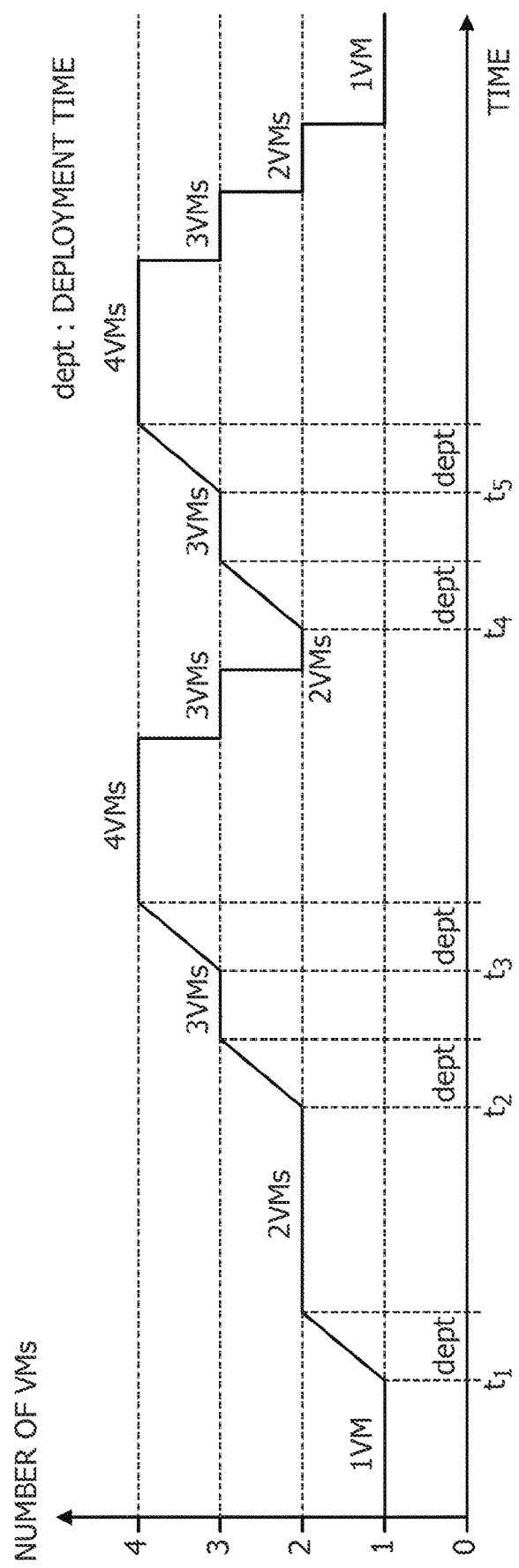
FIG. 1 is a diagram illustrating an example of existing auto-scaling.

FIG. 1 illustrates an example of existing auto-scaling. In FIG. 1, the vertical axis indicates the number of virtual machines (VMs), and the horizontal axis indicates time. In FIG. 1, $t_i$ (i is a natural number) denotes a time point at which the VMs become insufficient, and the scaling-out is desirable. In FIG. 1, "dept" denotes a time required for the deployment (hereinafter, referred to as "deployment time").

In the example of FIG. 1, the initial number of VMs is 1. The maximum number of VMs is 4. The scaling-out is executed in a state that the number of VMs is 1, and the number of VMs becomes 2. The scaling-out is executed in a state that the number of VMs is 2, and the number of VMs becomes 3. The scaling-out is executed in a state that the number of VMs is 3, and the number of VMs becomes 4. The scaling-in is executed in a state that the number of VMs is 4, and the number of VMs becomes 3. The scaling-in is executed in a state that the number of VMs is 3, and the number of VMs becomes 2. The scaling-out is executed in a state that the number of VMs is 2, and the number of VMs becomes 3. The scaling-out is executed in a state that the number of VMs is 3, and the number of VMs becomes 4. The scaling-in is executed in a state that the number of VMs is 4, and the number of VMs becomes 3. The scaling-in is executed in a state that the number of VMs is 3, and the number of VMs becomes 2. The scaling-in is executed in a state that the number of VMs is 2, and the number of VMs becomes 1.

In the example of FIG. 1, the deployment is executed five times. The deployment is started after the VMs actually become insufficient. Therefore, the insufficient state of the number of VMs continues for a long time due to the long deployment time.

Figure 2:
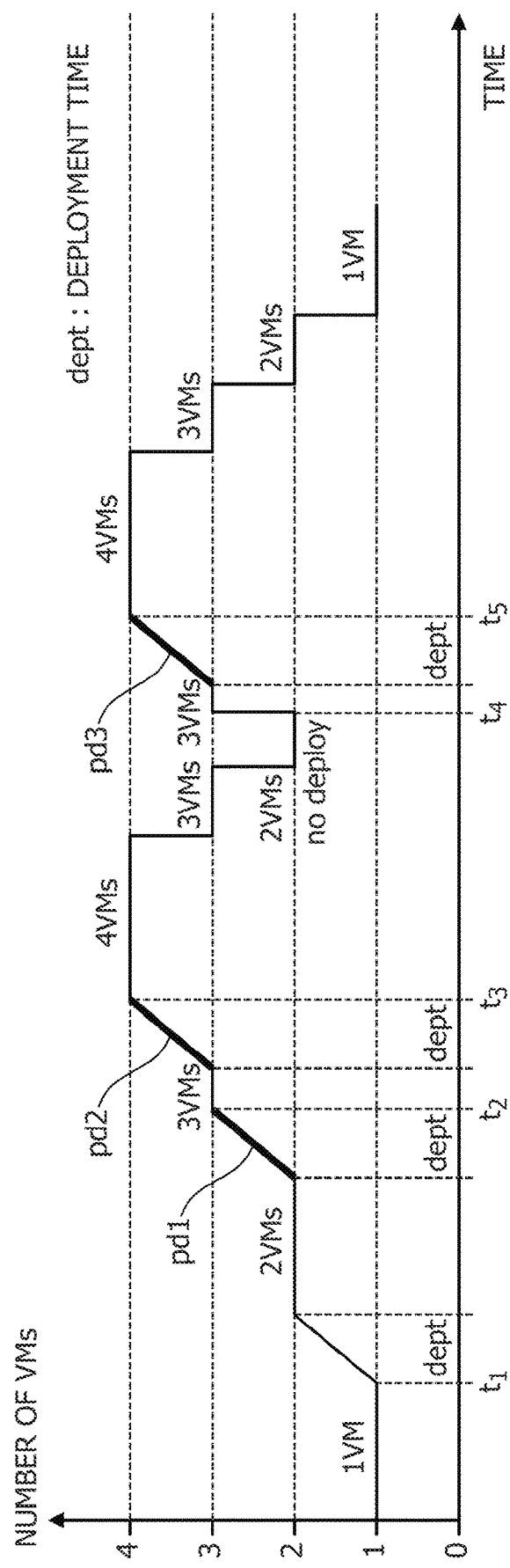
FIG. 2 is a diagram illustrating an example of auto-scaling according to embodiments.

FIG. 2 illustrates an example of auto-scaling according to the embodiments. In FIG. 2, the vertical axis indicates the number of VMs, and the horizontal axis indicates time. In the example of FIG. 2, the initial number of the number of VMs is also 1, and the maximum number of VMs is also 4. The number of VMs also changes as in the example of FIG. 1.

In the embodiments, the deployment is started before the actual detection of the high load on the VMs, except for the first deployment. For example, a deployment pd1, a deployment pd2, and a deployment pd3 are executed before the actual detection of the high load on the VMs. In this way, when the deployment in the process of auto-scaling is executed in advance, the scaling-out is completed merely the operation of the VMs is started upon the actual detection of the high load on the VMs, and this may reduce the long continuation of the high load state of the VMs. Therefore, the scaling-out may be quickly completed when the VMs are insufficient.

In the example of FIG. 2, the number of VMs is decreased from 3 to 2 by the scaling-in, and then the number of VMs is increased from 2 to 3 by the scaling-out. However, unlike in the example of FIG. 1, the deployment is not executed, and as a whole, the deployment is executed four times. In this way, the deployed VM is not deleted, and the VM is reused when the VM is needed later. Therefore, the entire processing time may be shortened, and the processing load generated by the deployment of the VM may be reduced.

First Embodiment

Figure 3:
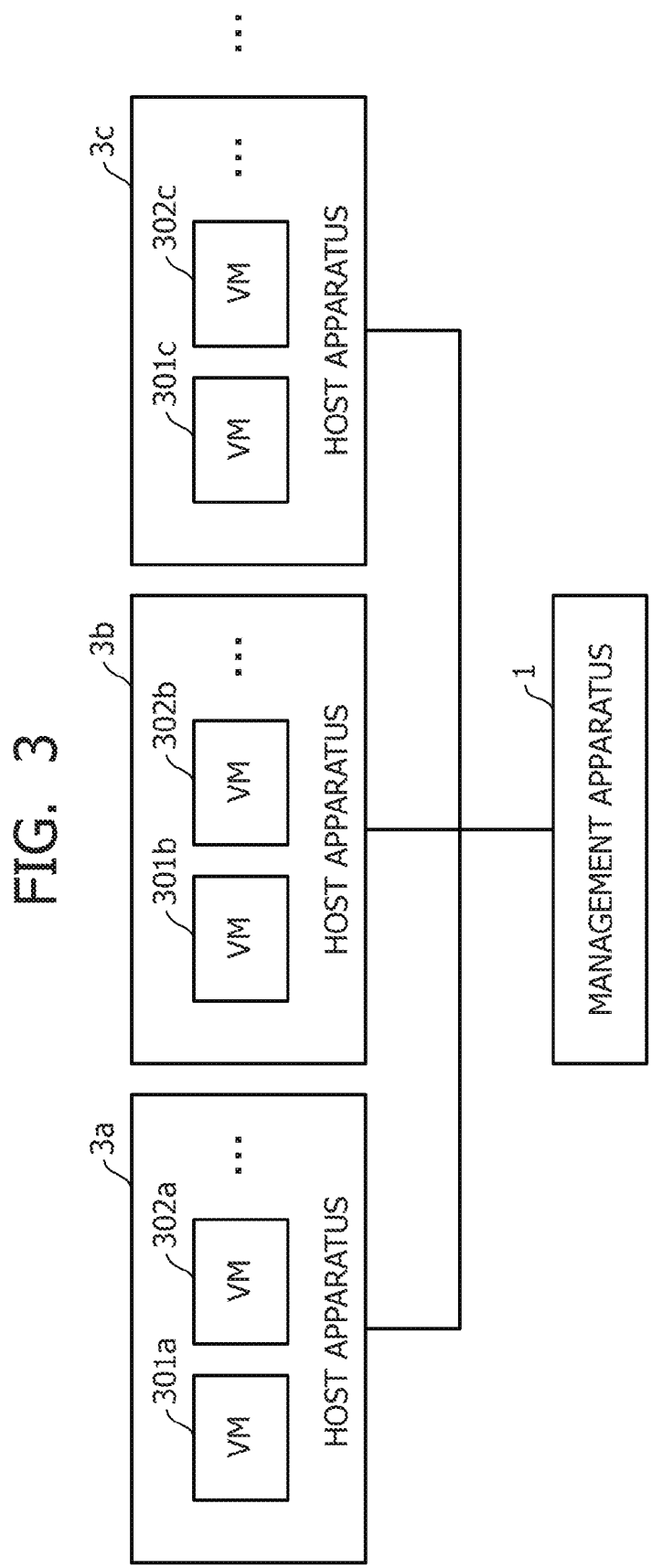
FIG. 3 is a diagram illustrating a system according to a first embodiment.

FIG. 3 illustrates a system according to a first embodiment. The system according to the present embodiment is, for example, a cloud system and is constructed in a data center or the like. The system according to the present embodiment includes host apparatuses 3a to 3c that operate VMs and a management apparatus 1 that manages the operation of the VMs. The management apparatus 1 is coupled to the host apparatuses 3a to 3c through a network such as a local area network (LAN). A VM 301a and a VM 302a operate in the host apparatus 3a. A VM 301b and a VM 302b operate in the host apparatus 3b. A VM 301c and a VM 302c operate in the host apparatus 3c. Although two VMs operate in each host apparatus in the example of FIG. 3, three or more VMs may operate. The number of host apparatuses may also be four or more.

Figure 4:
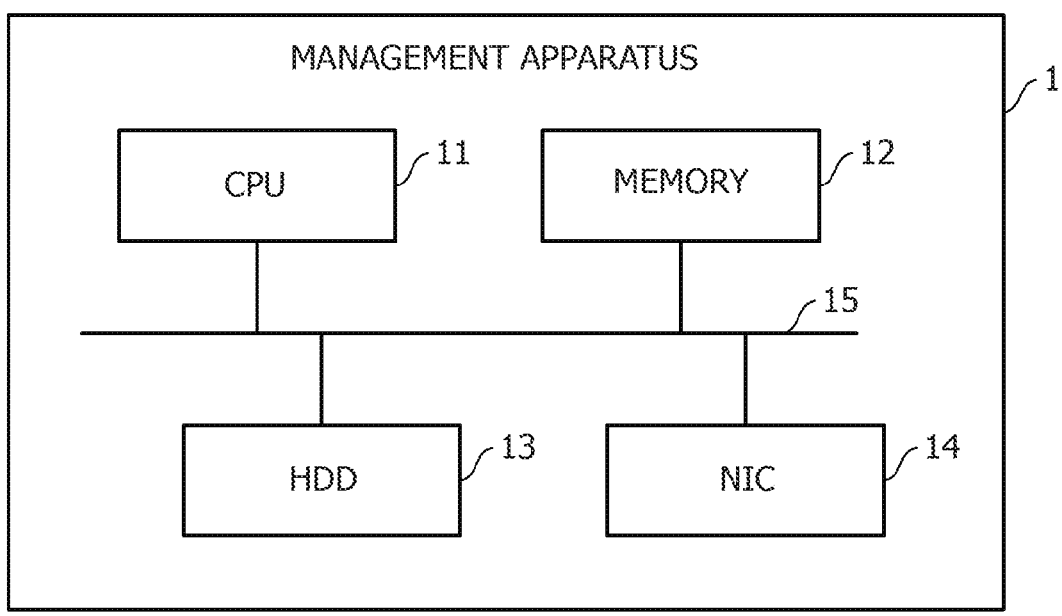
FIG. 4 is a diagram illustrating an exemplary hardware configuration of a management apparatus.

FIG. 4 illustrates an exemplary hardware configuration of the management apparatus 1. The management apparatus 1 includes a central processing unit (CPU) 11, a memory 12 such as a dynamic random access memory (DRAM), a hard disk drive (HDD) 13, and a network interface card (NIC) 14. Each hardware component is coupled to a bus 15.

Figure 5:
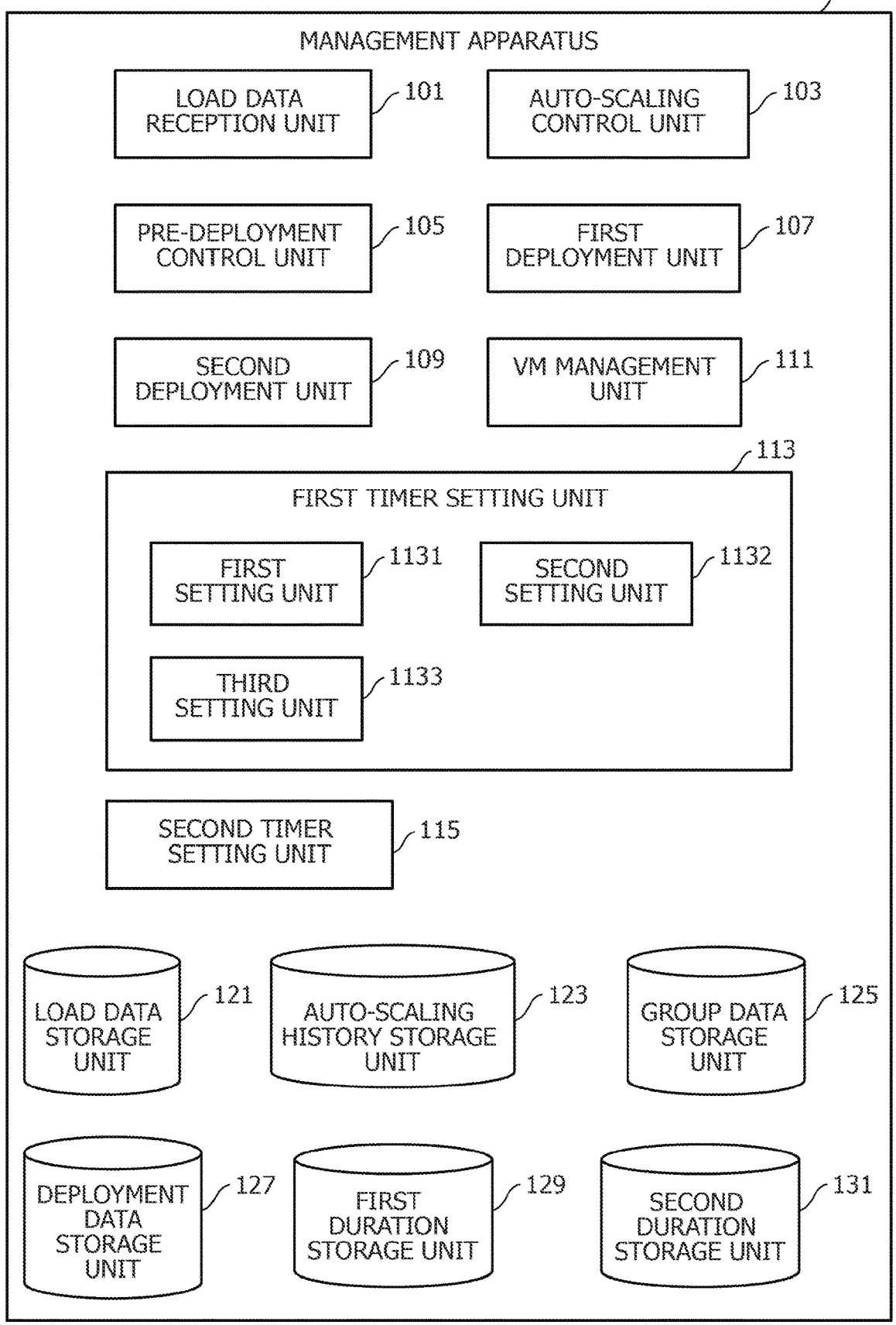
FIG. 5 is a diagram illustrating an exemplary functional configuration of a management apparatus.

FIG. 5 illustrates an exemplary functional configuration of the management apparatus 1. The management apparatus 1 includes a load data reception unit 101, an auto-scaling control unit 103, a pre-deployment control unit 105, a first deployment unit 107, a second deployment unit 109, a VM management unit 111, a first timer setting unit 113, a second timer setting unit 115, a load data storage unit 121, an auto-scaling history storage unit 123, a group data storage unit 125, a deployment data storage unit 127, a first duration storage unit 129, and a second duration storage unit 131. The first timer setting unit 113 includes a first setting unit 1131, a second setting unit 1132, and a third setting unit 1133.

A program for executing processes of the present embodiment is stored in, for example, the HDD 13. The program is loaded to the memory 12 and executed by the CPU 11 to implement the load data reception unit 101, the auto-scaling control unit 103, the pre-deployment control unit 105, the first deployment unit 107, the second deployment unit 109, the VM management unit 111, the first timer setting unit 113, and the second timer setting unit 115. The load data storage unit 121, the auto-scaling history storage unit 123, the group data storage unit 125, the deployment data storage unit 127, the first duration storage unit 129, and the second duration storage unit 131 are provided in, for example, the memory 12 or the HDD 13.

The load data reception unit 101 stores load data received from the host apparatuses 3a to 3c in the load data storage unit 121. The auto-scaling control unit 103 executes a process based on the data stored in the load data storage unit 121 and data stored in the group data storage unit 125 and stores processing results in the auto-scaling history storage unit 123, the first duration storage unit 129, and the second duration storage unit 131. The pre-deployment control unit 105 controls execution of a pre-deployment process described later based on the data stored in the auto-scaling history storage unit 123, the data stored in the group data storage unit 125, the data stored in the first duration storage unit 129, and the data stored in the second duration storage unit 131. The first deployment unit 107 executes a deployment process described later and stores processing results in the deployment data storage unit 127. The second deployment unit 109 executes a pre-deployment process described later and updates the data stored in the deployment data storage unit 127 based on processing results. The VM management unit 111 transmits a request for deleting a VM and a request for starting the operation of a VM to the host apparatuses 3a to 3c. The first timer setting unit 113 including the first setting unit 1131, the second setting unit 1132, and the third setting unit 1133 determines the time for starting the deployment of a VM based on the data stored in the auto-scaling history storage unit 123, the data stored in the deployment data storage unit 127, and the data stored in the first duration storage unit 129. The second timer setting unit 115 determines the time for deleting the VM deployed by the pre-deployment process based on the data stored in the deployment data storage unit 127.

Figure 6:
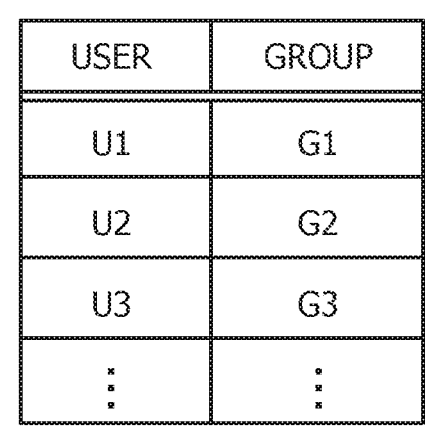

FIG. 6 illustrates an example of first group data stored in the group data storage unit 125. In the example of FIG. 6, identification information of a group including VMs allocated to a user is stored in association with identification information of the user. In the present embodiment, one group is associated with one user.

Figure 7:
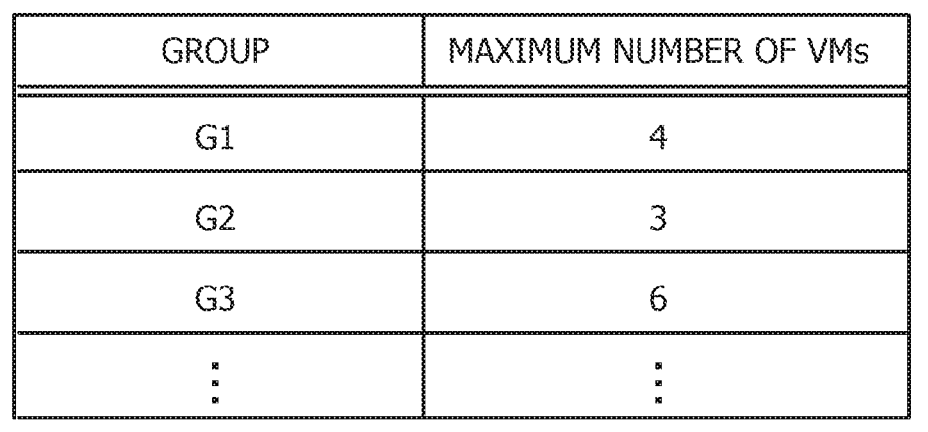

FIG. 7 illustrates an example of second group data stored in the group data storage unit 125. In the example of FIG. 7, information of the maximum number of VMs belonging to a group is stored in association with the identification information of the group.

Figure 8:
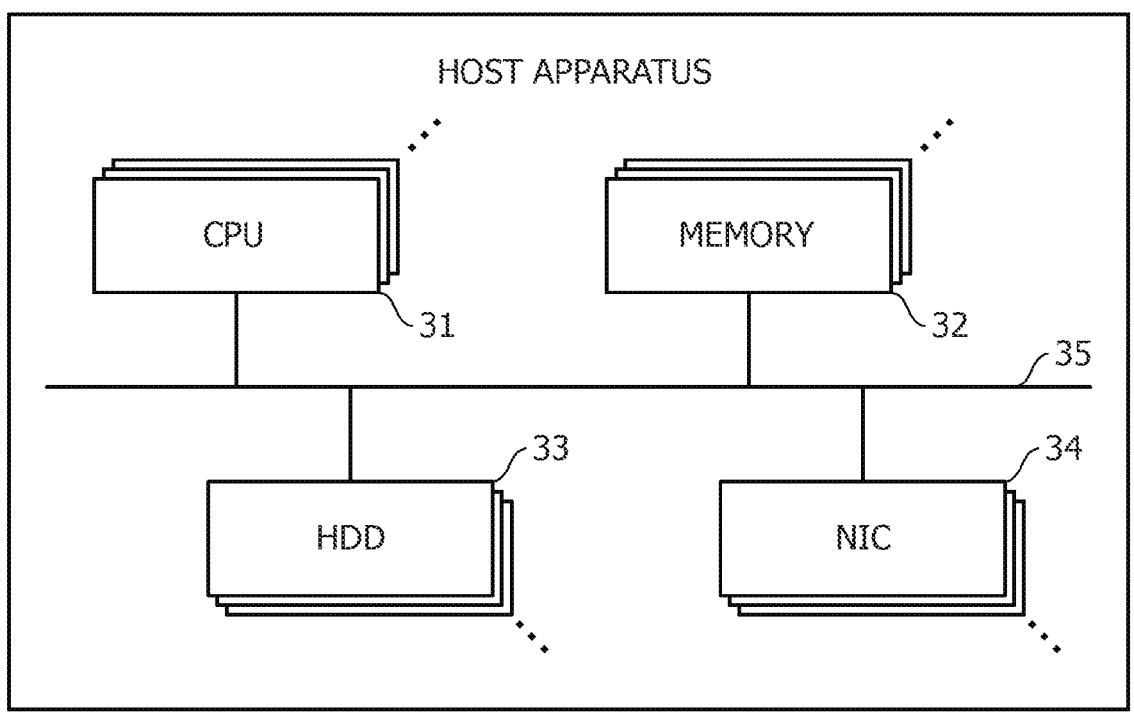
FIG. 8 is a diagram illustrating an exemplary hardware configuration of a host apparatus.

FIG. 8 illustrates an exemplary hardware configuration of the host apparatuses 3a to 3c. Each of the host apparatuses 3a to 3c includes at least one CPU 31, at least one memory 32, at least one HDD 33, and at least one NIC 34. Each hardware component is coupled to a bus 35.

In the present embodiment, a program of, for example, a hypervisor (also called virtualization software) is stored in the HDD 33. The program is loaded to the memory 32 and executed by the CPU 31 to operate the hypervisor. The VMs 301a and 302a, the VMs 301b and 302b, and the VMs 301c and 302c operate on the hypervisor.

Next, the processes executed by the management apparatus 1 will be described.

Figure 9:
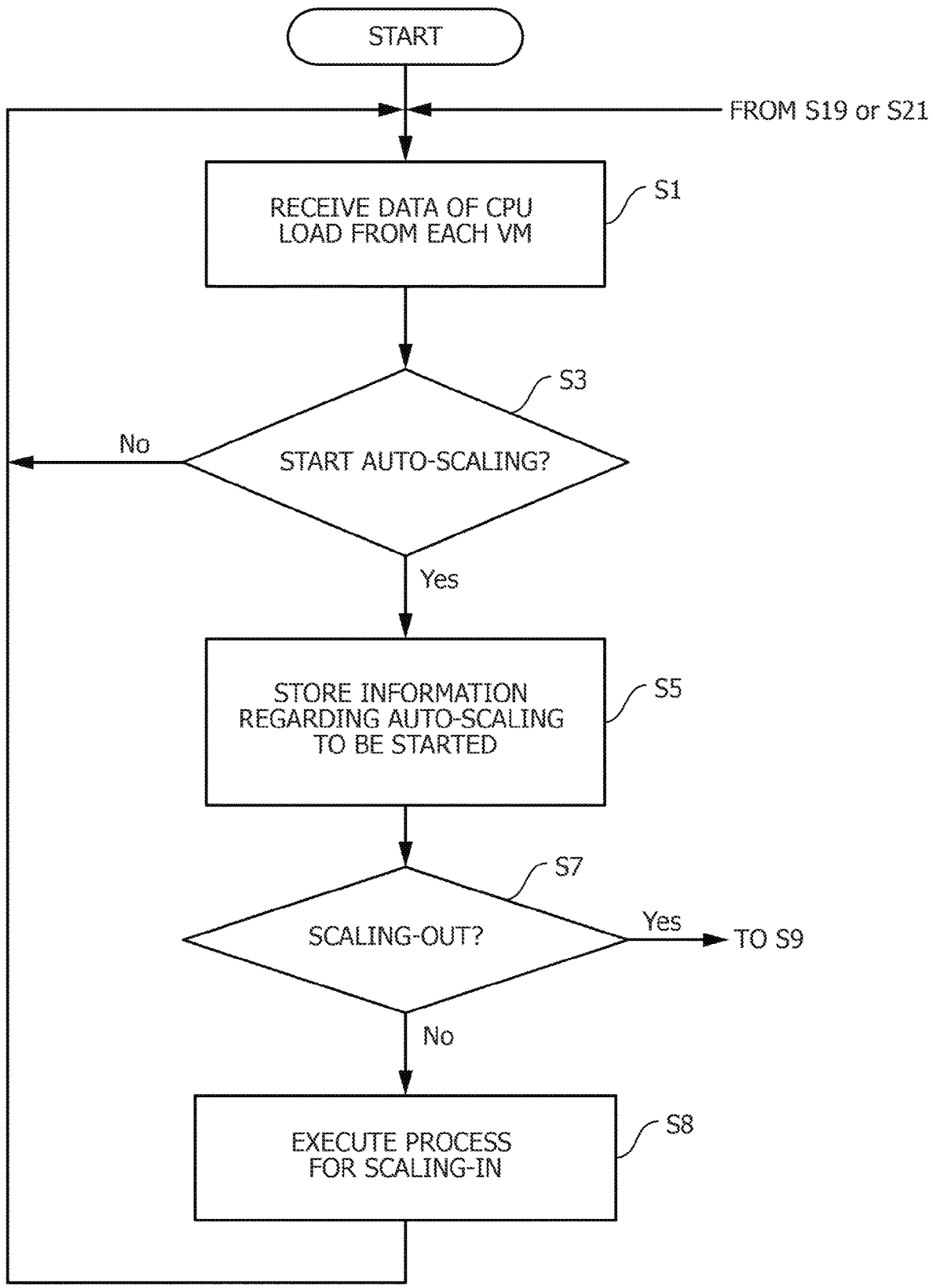
FIG. 9 is a flowchart illustrating a process of controlling execution of auto-scaling.

FIG. 9 illustrates a process of controlling the execution of the auto-scaling. This process is executed for each group (for example, each of a plurality of threads executes this process for one group).

The load data reception unit 101 receives data of CPU load (for example, CPU utilization) from each VM operating in the host apparatuses 3a to 3c (step S1). The load data reception unit 101 stores the received data of CPU load in the load data storage unit 121.

FIG. 10 illustrates an example of the data stored in the load data storage unit 121. In the example of FIG. 10, the data of CPU load on the CPU 31 allocated to a VM is stored at each time point. The data as illustrated in FIG. 10 is prepared for each VM.

The auto-scaling control unit 103 determines whether to start the auto-scaling based on the data of CPU load stored in the load data storage unit 121 (step S3). For example, the auto-scaling control unit 103 determines to start the scaling-out when there is a VM in which the most recent CPU load is equal to or greater than a threshold (for example, 70%) or when the average value of the most recent CPU loads on the VMs belonging to the target group is equal to or greater than a threshold (for example, 70%). On the other hand, the auto-scaling control unit 103 determines to start the scaling-in when there is a VM in which the most recent CPU load is smaller than a threshold (for example, 40%) or when the average value of the most recent CPU loads on the VMs belonging to the target group is smaller than a threshold (for example, 40%). The auto-scaling is not started when neither the scaling-out nor the scaling-in is started.

When the auto-scaling control unit 103 determines not to start the auto-scaling (step S3: No), the process returns to step S1. When the auto-scaling control unit 103 determines to start the auto-scaling (step S3: Yes), the auto-scaling control unit 103 executes the following process. For example, the auto-scaling control unit 103 stores information regarding the auto-scaling to be started in the auto-scaling history storage unit 123 (step S5). The auto-scaling control unit 103 also notifies the pre-deployment control unit 105 of information indicating the start of the auto-scaling and indicating the scaling-out or the scaling-in as the auto-scaling to be started.

FIG. 11 illustrates an example of the data stored in the auto-scaling history storage unit 123. In the example of FIG. 11, the number of a record, state information indicating the state after the auto-scaling, the start time of the state, the end time of the state, duration of the state, and auto-scaling information indicating the scaling-out or the scaling-in are stored. Here, the number of the record, the state information, the start time of the state, and the auto-scaling information are stored at the time of the process of step S5. The end time of the state and the duration of the state are stored in a later process. The start time of a record is the same as the end time of the preceding record.

The auto-scaling control unit 103 determines whether the auto-scaling to be started is the scaling-out (step S7).

When it is determined that the auto-scaling to be started is not the scaling-out (step S7: No), the auto-scaling control unit 103 executes a process of the scaling-in (step S8). For example, the auto-scaling control unit 103 causes the VM management unit 111 to execute a process of transmitting a request for stopping the operation of a VM to one of the host apparatuses 3a to 3c. The host apparatus that has received the request stops the operation of one VM. Note that when the auto-scaling executed before the scaling-in of this time (i.e., the auto-scaling of the last time) is the scaling-in, the image file of the VM of which the operation is stopped by the scaling-in of the last time may be deleted from the HDD 33 after the process of step S8. In this case, the time point of the end of the process of step S8 may be assumed as the end time of a record (the preceding record) just before the record of the scaling-in of this time. Therefore, the auto-scaling control unit 103 stores the time point of the end of the process of step S8 as the end time of the preceding record in the auto-scaling history storage unit 123. The auto-scaling control unit 103 also stores the duration of the preceding record that is a time from the start time to the end time in the auto-scaling history storage unit 123.

When it is determined that the auto-scaling to be started is the scaling-out (step S7: Yes), the process moves to step S9 of FIG. 12.

Figure 12:
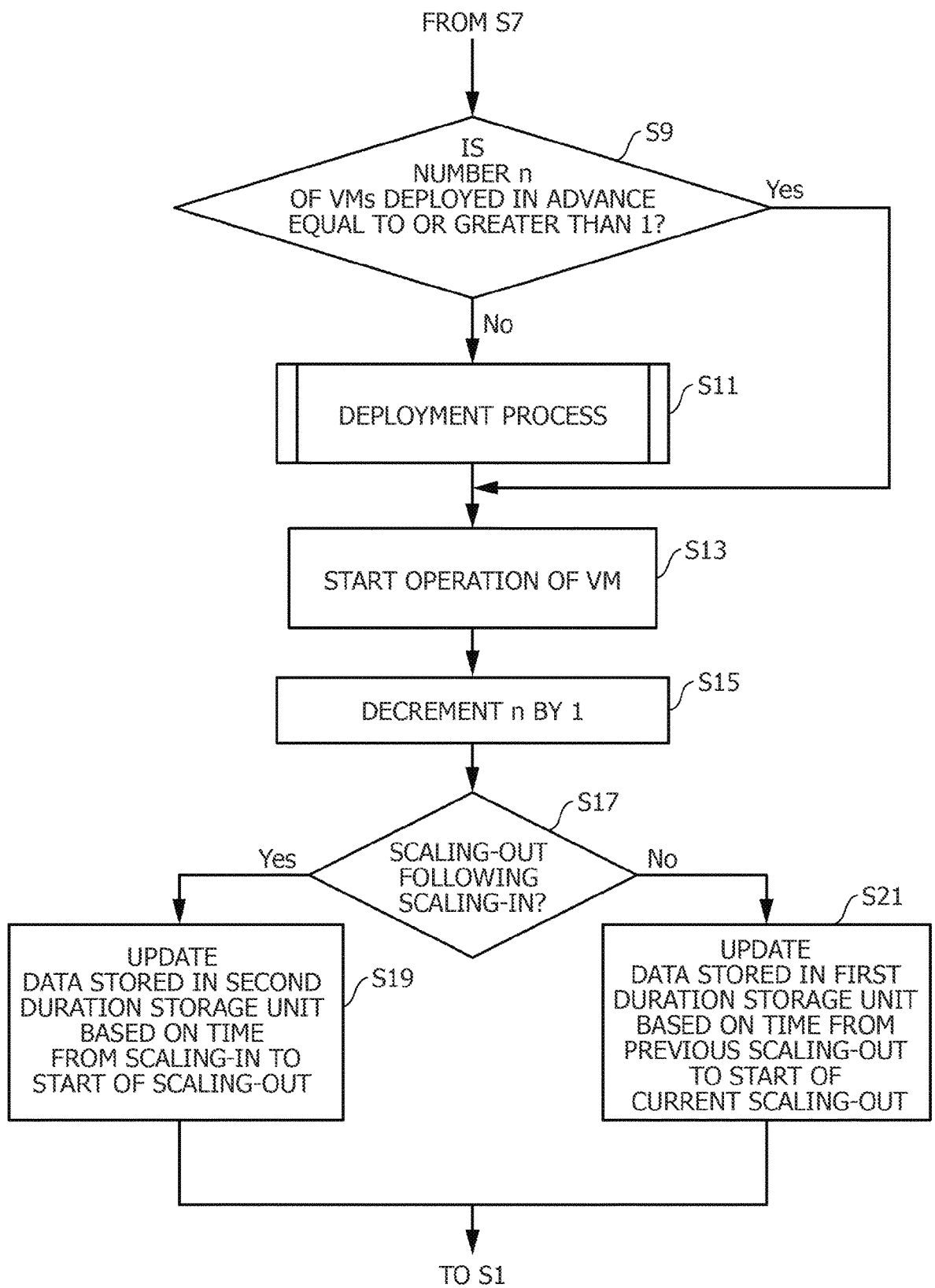
FIG. 12 is a flowchart illustrating a process of controlling execution of auto-scaling.
Figure 13:
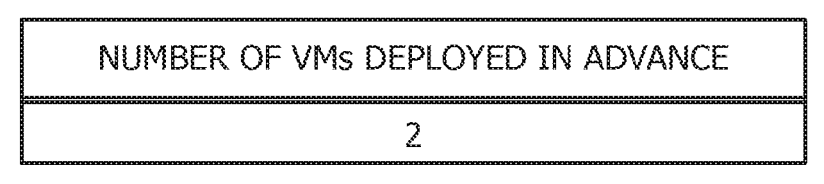

In FIG. 12, the auto-scaling control unit 103 determines whether the number n of VMs deployed in advance is equal to or greater than 1 (step S9). The number n is stored in the memory 12 or the HDD 13 in a format, for example, as illustrated in FIG. 13.

When it is determined that the number n of VMs deployed in advance is equal to or greater than 1 (step S9: Yes), the VMs deployed in advance may be used for the auto-scaling, and the process moves to step S13 without executing the deployment.

When it is determined that the number n of VMs deployed in advance is 0 (step S9: No), the auto-scaling control unit 103 calls the first deployment unit 107. In response, the first deployment unit 107 executes a deployment process that is a process for deploying the VM (step S11).

Figure 14:
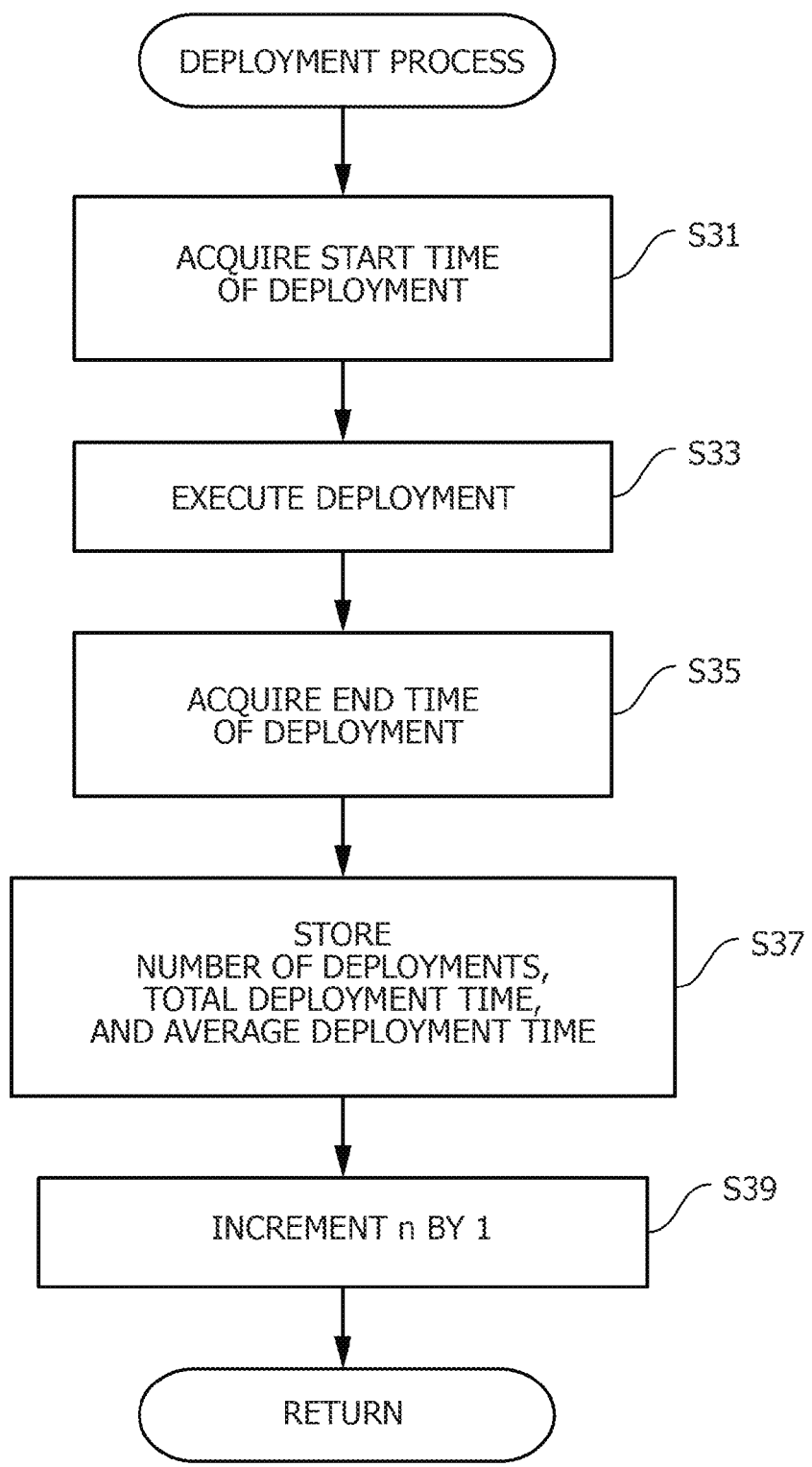
FIG. 14 is a flowchart illustrating a deployment process.

FIG. 14 illustrates the deployment process.

The first deployment unit 107 acquires information of the start time of the deployment (for example, the time point of the process of step S31) from, for example, an operating system (OS) (step S31).

The first deployment unit 107 causes one of the host apparatuses 3a to 3c to execute the deployment (step S33). For example, the first deployment unit 107 transmits a request for executing the deployment of one VM belonging to the target group to one of the host apparatuses 3a to 3c. The host apparatus that has received the request starts to write, to the HDD 33, an image file downloaded from, for example, an apparatus on the network. The image file is a file for generating the VM and is a file in the state that the OS of the VM is installed. The image file is prepared for, for example, each type of OS.

Upon receiving a notification indicating the end of the deployment from the host apparatus, the first deployment unit 107 acquires information of the end time of the deployment (for example, the time point of the process of step S35) from, for example, the OS (step S35).

The first deployment unit 107 stores the number of deployments, the total deployment time, and the average deployment time in the deployment data storage unit 127 (step S37). The first deployment unit 107 further increments n by 1 (step S39). The process then returns to the caller. When the number of deployments, the total deployment time, and the average deployment time are already stored in the deployment data storage unit 127, the data is updated.

FIG. 15 illustrates an example of the data stored in the deployment data storage unit 127. In the example of FIG. 15, the number of deployments, the total deployment time, and the average deployment time are stored. The number of deployments is the number of deployments executed up to the process of step S37. The total deployment time is a total time of the executed deployment. The average deployment time is calculated by dividing the total deployment time by the number of deployments.

Retuning to FIG. 12, the VM management unit 111 starts the operation of the VM deployed in advance or the VM deployed in step S11 (step S13). For example, the VM management unit 111 transmits a request for starting the operation of the VM to the host apparatus in which the VM is deployed. Note that the time point of the end of the process of step S13 may be assumed as the end time of the preceding record. Therefore, the auto-scaling control unit 103 stores the time point of the end of the process of step S13 as the end time of the preceding record in the auto-scaling history storage unit 123. The auto-scaling control unit 103 also stores the duration of the preceding record that is a time from the start time to the end time in the auto-scaling history storage unit 123.

The auto-scaling control unit 103 decrements n by 1 (step S15).

The auto-scaling control unit 103 determines whether the scaling-out of this time is the scaling-out following scaling-in based on whether the auto-scaling information of the preceding record stored in the auto-scaling history storage unit 123 is "scaling-in" (step S17).

When it is determined that the scaling-out of this time is the scaling-out following scaling-in (step S17: Yes), the auto-scaling control unit 103 executes the following process. For example, the auto-scaling control unit 103 updates the data stored in the second duration storage unit 131 based on the duration of the preceding record stored in the auto-scaling history storage unit 123 (here, duration stored in the auto-scaling history storage unit 123 after most recent step S13) (step S19). The process then returns to step S1 of FIG. 9. The duration used for the update in step S19 is a time from the scaling-in to the start of the scaling-out, that is, a time for which the number of VMs that has been decreased by the scaling-in returns to the former number of VMs by the scaling-out.

FIG. 16 illustrates an example of the data stored in the second duration storage unit 131. In the example of FIG. 16, the state information, the total duration, the number of instances, and the average duration are stored. When the number of VMs is decreased to 2 after the scaling-in, and the number of VMs is increased to 3 by the scaling-out of this time, the duration stored in the auto-scaling history storage unit 123 after the process of most recent step S13 is added to the total duration in the first record. In addition, the number of instances is incremented by 1, and the average duration is updated based on the total duration and the number of instances.

On the other hand, when it is determined that the scaling-out of this time is not the scaling-out following scaling-in (step S17: No), the auto-scaling control unit 103 executes the following process. For example, the auto-scaling control unit 103 updates the data stored in the first duration storage unit 129 based on the duration of the preceding record stored in the auto-scaling history storage unit 123 (here, duration stored in the auto-scaling history storage unit 123 after most recent step S13) (step S21).

FIG. 17 illustrates an example of the data stored in the first duration storage unit 129. In the example of FIG. 17, the state information, the total duration, the number of instances, and the average duration are stored. When the number of VMs is increased from 3 to 4 after the scaling-out of this time, the duration stored in the auto-scaling history storage unit 123 after the process of most recent step S13 is added to the total duration in the third record. In addition, the number of instances is incremented by 1, and the average duration is updated based on the total duration and the number of instances.

Figure 18:
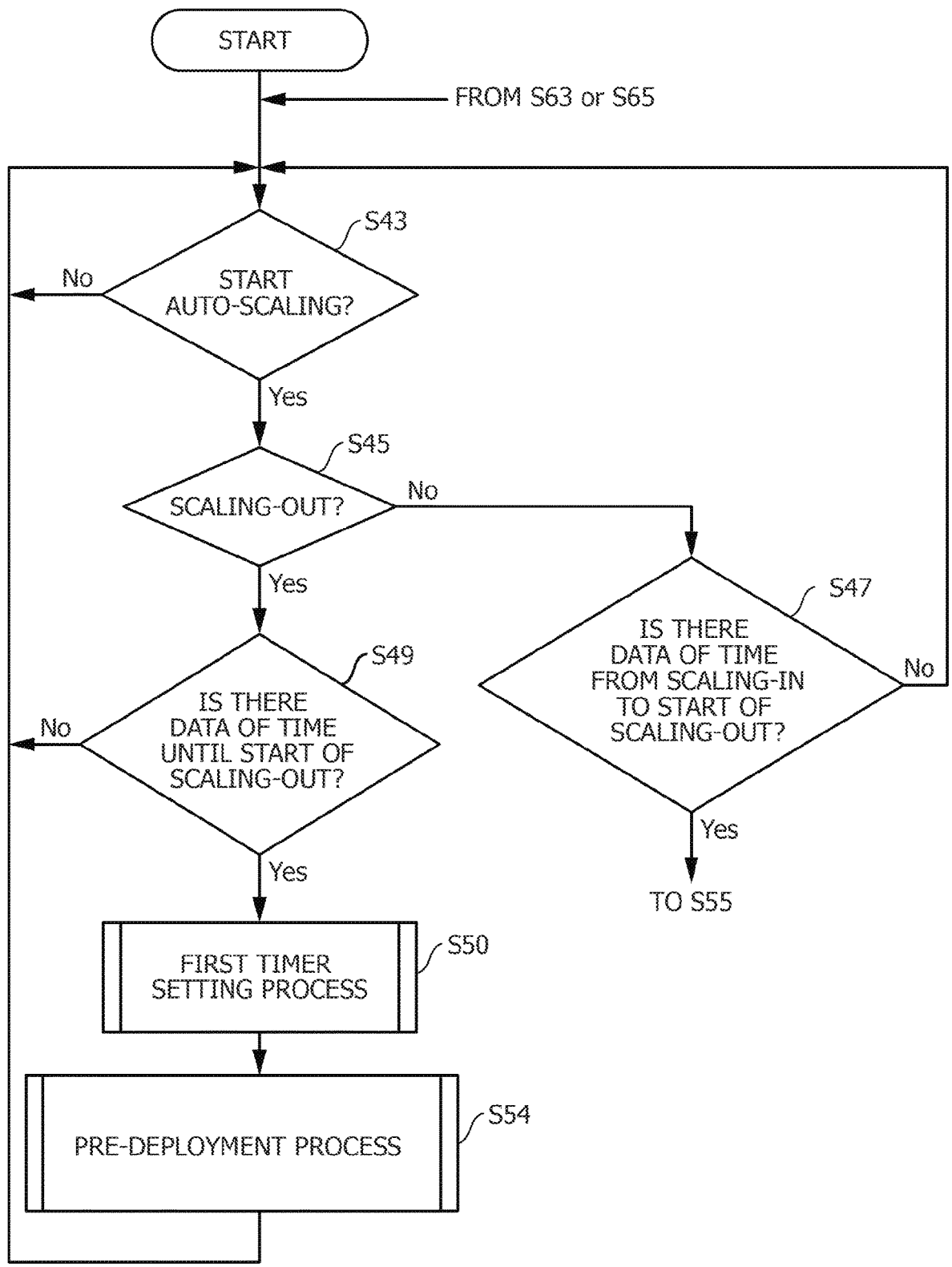
FIG. 18 is a flowchart illustrating a process of controlling execution of a pre-deployment process in a first embodiment.

FIG. 18 illustrates a process of controlling the execution of the pre-deployment process in the first embodiment. This process is executed for each group (for example, each of a plurality of threads executes this process for one group).

The pre-deployment control unit 105 determines whether the auto-scaling is to be started, based on whether the notification is received from the auto-scaling control unit 103 (step S43).

When it is determined that the auto-scaling is not to be started (step S43: No), the process returns to step S43. When it is determined that the auto-scaling is to be started (step S43: Yes), the pre-deployment control unit 105 determines whether the auto-scaling to be started is the scaling-out, based on the notification from the auto-scaling control unit 103 (step S45).

When it is determined that the auto-scaling to be started is the scaling-out (step S45: Yes), the pre-deployment control unit 105 executes the following process. For example, the pre-deployment control unit 105 determines whether the first duration storage unit 129 includes data of the time until the start of the scaling-out (here, average duration until the execution of the scaling-out) regarding the current number of VMs (the number of VMs currently operating in the host apparatus) (step S49).

When it is determined that the first duration storage unit 129 does not include the data of the time until the start of the scaling-out regarding the current number of VMs (step S49: No), the process returns to step S43. When it is determined that the first duration storage unit 129 includes the data of the time until the start of the scaling-out regarding the current number of VMs (step S49: Yes), the pre-deployment control unit 105 calls the first timer setting unit 113. In response, the first timer setting unit 113 executes a first timer setting process of setting a timer regarding the time point for starting the pre-deployment process (step S50).

Figure 19:
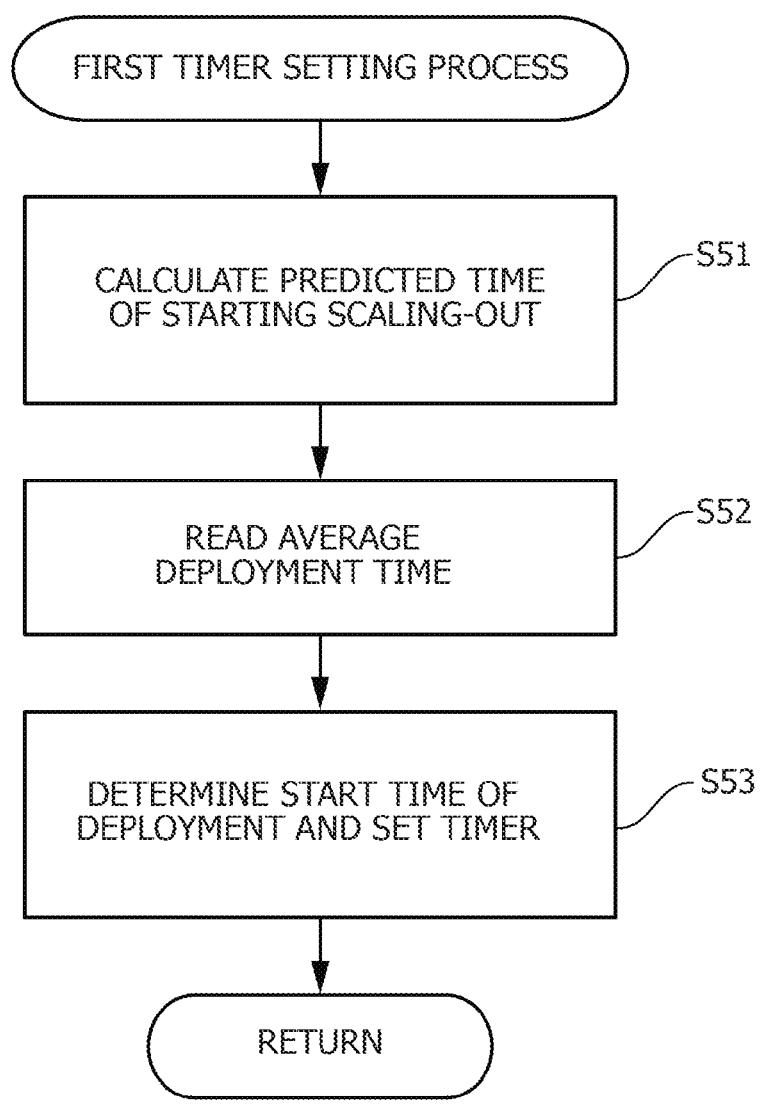
FIG. 19 is a flowchart illustrating a first timer setting process.

FIG. 19 illustrates the first timer setting process.

The first setting unit 1131 reads the start time included in the latest record from the auto-scaling history storage unit 123 and reads the average duration corresponding to the current number of VMs from the first duration storage unit 129. The first setting unit 1131 then adds the average duration to the start time to obtain a predicted time of starting the next scaling-out (step S51).

The second setting unit 1132 reads the average deployment time stored in the deployment data storage unit 127 (step S52).

The third setting unit 1133 subtracts the average deployment time read in step S52 from the predicted time calculated in step S51 to determine the start time of the deployment. The third setting unit 1133 then sets the timer to time out at the determined start time (step S53). The process then returns to the caller.

Figure 20:
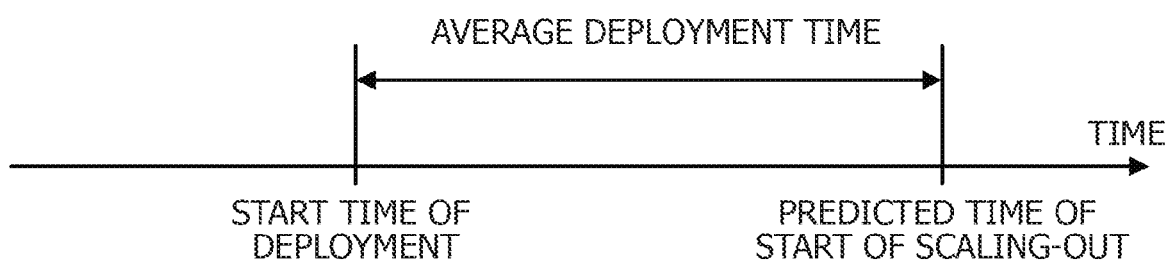
FIG. 20 is a diagram for describing determination of a start time of deployment.

FIG. 20 is a diagram for describing the determination of the start time of the deployment. As illustrated in FIG. 20, the start time of the deployment is determined to be a time point prior to the predicted time of starting the scaling-out by the average deployment time. In this way, the deployment may be completed before starting the scaling-out, and the VM may be quickly operated after the start of the scaling-out. Therefore, the time before the completion of the scaling-out may be shortened. Note that in step S53, the start time of the deployment time may be prior to the predicted time more than the average deployment time.

Returning to FIG. 18, the pre-deployment control unit 105 calls the second deployment unit 109 when the timer set in step S53 has timed out. The second deployment unit 109 then executes a pre-deployment process (step S54). After the pre-deployment process is finished, the process returns to step S43.

Figure 21:
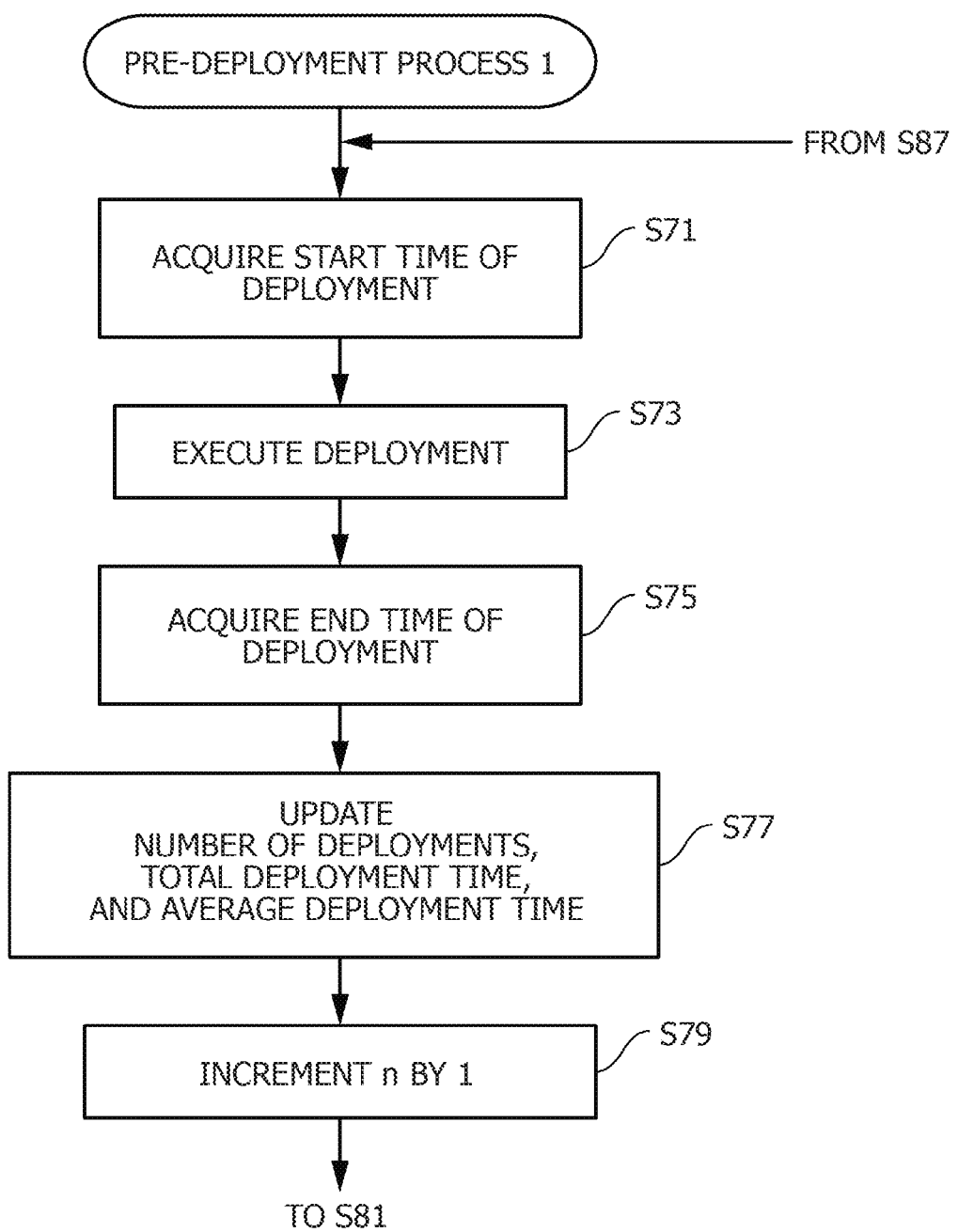
FIG. 21 is a flowchart illustrating a pre-deployment process.

FIG. 21 illustrates the pre-deployment process.

The second deployment unit 109 acquires information of the start time of the deployment (for example, the time point of the process of step S71) from, for example, the OS (step S71).

The second deployment unit 109 causes one of the host apparatuses 3a to 3c to execute the deployment (step S73). For example, the second deployment unit 109 transmits a request for executing the deployment of one VM belonging to the target group to one of the host apparatuses 3a to 3c. The host apparatus that has received the request starts to write, to the HDD 33, an image file downloaded from, for example, an apparatus on the network.

Upon receiving a notification indicating the end of the deployment from the host apparatus, the second deployment unit 109 acquires information of the end time of the deployment (for example, the time point of the process of step S75) from, for example, the OS (step S75).

The second deployment unit 109 updates the number of deployments, the total deployment time, and the average deployment time stored in the deployment data storage unit 127 (step S77).

The second deployment unit 109 increments n by 1 (step S79). The process then moves to step S81 of FIG. 22.

Figure 22:
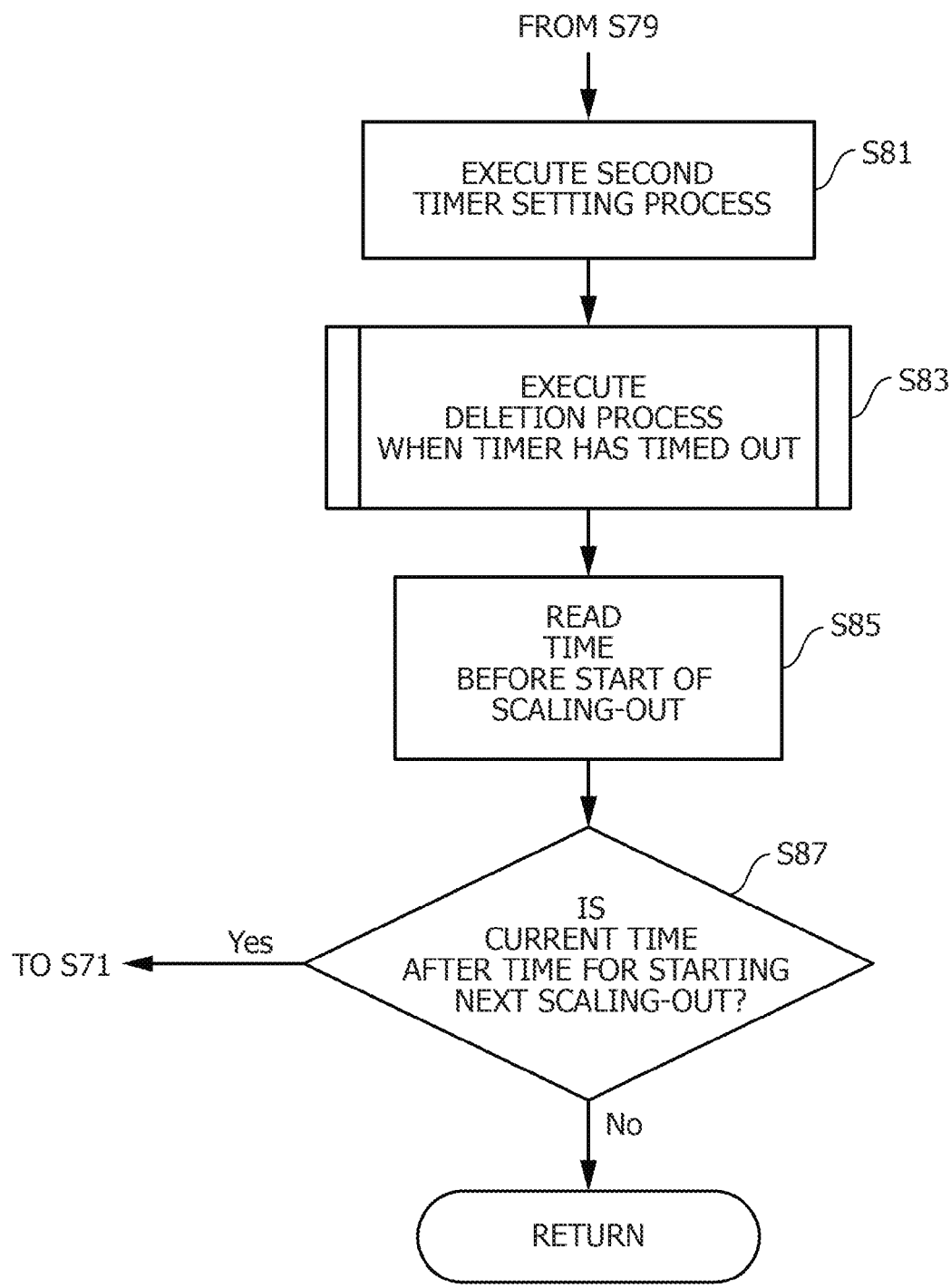
FIG. 22 is a flowchart illustrating a pre-deployment process.

In FIG. 22, second deployment unit 109 calls the second timer setting unit 115. The second timer setting unit 115 then executes a second timer setting process (step S81). The second timer setting process is a process of setting the timer to time out after a predetermined time (for example, five minutes) from the time of starting the scaling-out.

When the scaling-out is started before the timeout of the timer set in step S81, the second timer setting unit 115 discards the setting of the timer. When the timer set in step S81 has timed out, the second timer setting unit 115 calls the VM management unit 111. The VM management unit 111 then executes a deletion process of deleting the VM deployed in advance (step S83).

Figure 23:
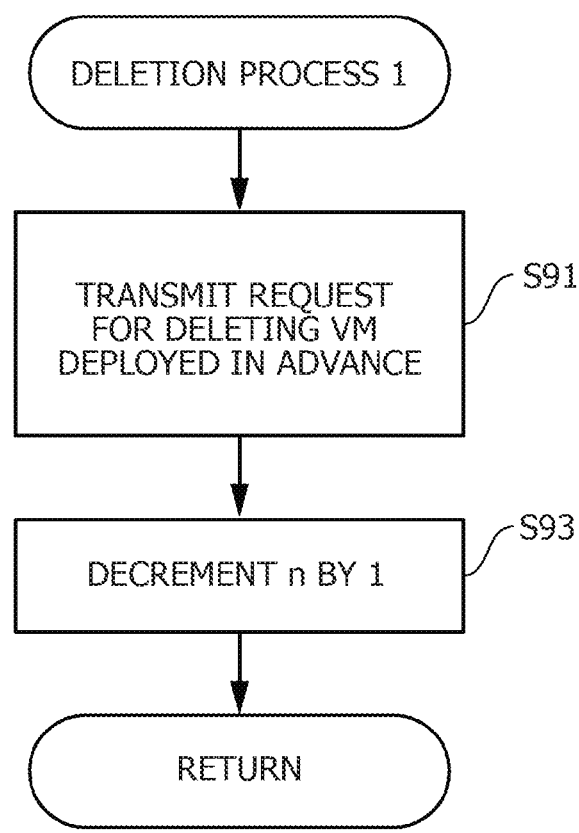
FIG. 23 is a flowchart illustrating a deletion process in a first embodiment.

FIG. 23 illustrates the deletion process in the first embodiment.

The VM management unit 111 transmits a request for deleting the VM deployed in the process of step S73 to the host apparatus that has deployed the VM in response to the request transmitted in step S73 (step S91). The host apparatus that has received the request for deleting the VM deletes the image file of the VM deployed in the process of step S73.

The VM management unit 111 decrements n by 1 (step S93). The process then returns to the caller.

Returning to FIG. 22, the second deployment unit 109 reads the data of the time until the start of the scaling-out regarding the current number of VMs from the first duration storage unit 129 (step S85). In step S85, the average duration corresponding to the current number of VMs is read from the first duration storage unit 129.

The second deployment unit 109 reads the start time of the current state from the auto-scaling history storage unit 123. The second deployment unit 109 then adds the time read in step S85 to the start time to calculate the time of starting the next scaling-out. The second deployment unit 109 then determines whether the current time is after the time of starting the next scaling-out (step S87).

When it is determined that the current time is after the time of starting the next scaling-out (step S87: Yes), the process returns to the process of step S71 of FIG. 21. When it is determined that the current time is not after the time of starting the next scaling-out (step S87: No), the process returns to the caller.

Returning to FIG. 18, when it is determined that the auto-scaling to be started is not the scaling-out (step S45: No), the pre-deployment control unit 105 executes the following process. For example, the pre-deployment control unit 105 determines whether the second duration storage unit 131 includes the data of the time from the scaling-in to the start of the scaling-out (here, average duration of the state after the scaling-in) regarding the current number of VMs (step S47).

When it is determined that the second duration storage unit 131 does not include the data of the time from the scaling-in to the start of the scaling-out regarding the current number of VMs (step S47: No), the process returns to step S43. When it is determined that the second duration storage unit 131 includes the data of the time from the scaling-in to the start of the scaling-out regarding the current number of VMs (step S47: Yes), the process moves to step S55 of FIG. 24.

Figure 24:
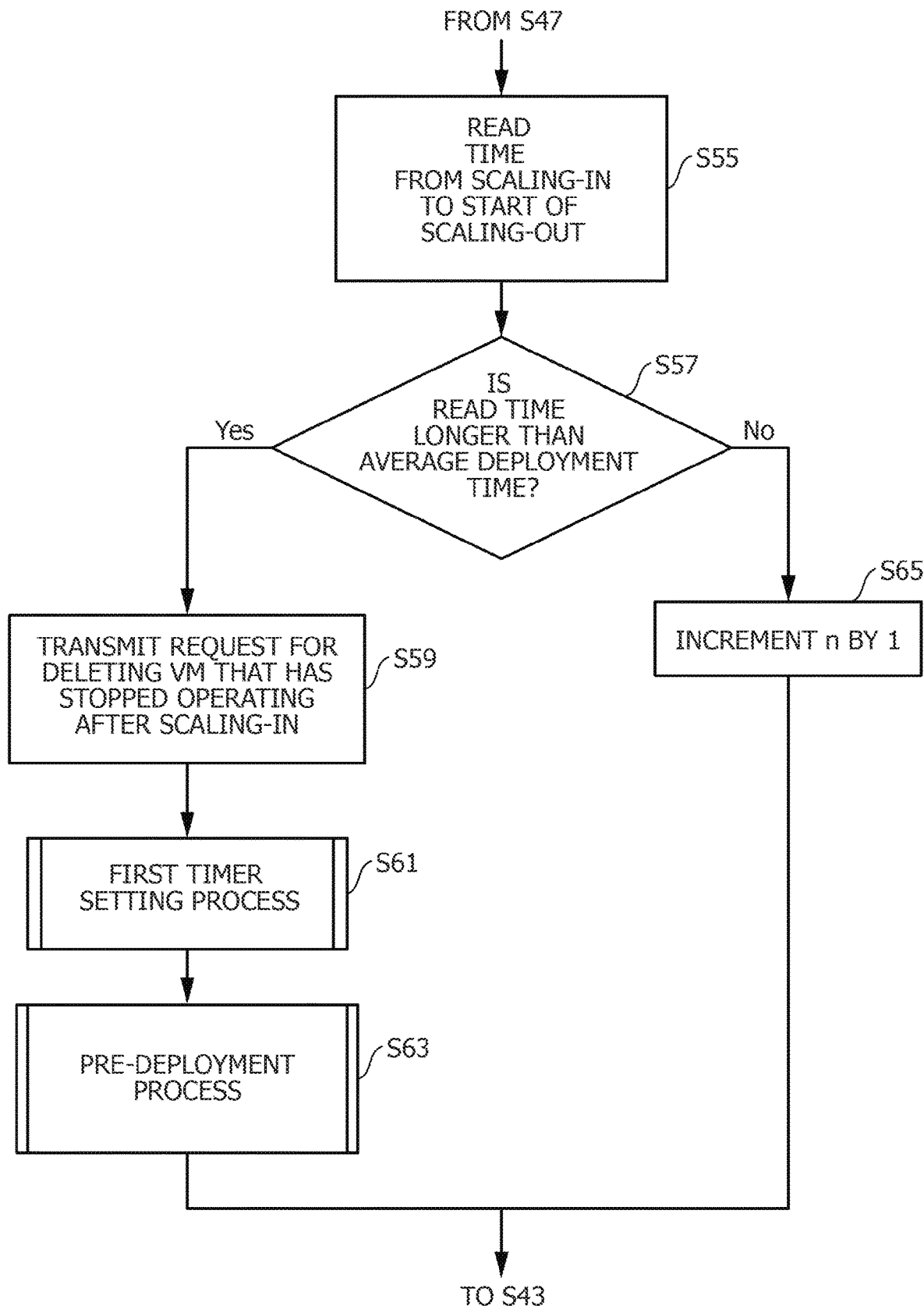
FIG. 24 is a flowchart illustrating a process of controlling execution of a pre-deployment process in a first embodiment.

In FIG. 24, the pre-deployment control unit 105 reads the data of the time from the scaling-in to the start of the scaling-out from the second duration storage unit 131 (step S55).

The pre-deployment control unit 105 reads the average deployment time from the deployment data storage unit 127. The pre-deployment control unit 105 then determines whether the time read in step S55 is longer than the average deployment time (step S57).

When it is determined that the time read in step S55 is longer than the average deployment time (step S57: Yes), the pre-deployment control unit 105 calls the VM management unit 111. The VM management unit 111 then transmits a request for deleting the VM that has stopped the operation after the scaling-in to the host apparatus that operates the VM (step S59). The host apparatus that has received the request deletes, from the HDD 33, the image file of the VM that has stopped the operation after the scaling-in.

The pre-deployment control unit 105 calls the first timer setting unit 113. In response, the first timer setting unit 113 executes the first timer setting process of setting the timer regarding the time of starting the execution of the pre-deployment process (step S61). The first timer setting process is as described above, and the description will not be repeated here.

The pre-deployment control unit 105 calls the second deployment unit 109 when the timer set in step S61 has timed out. The second deployment unit 109 then executes the pre-deployment process (step S63). The pre-deployment process is as described above, and the description will not be repeated here. After the pre-deployment process is finished, the process returns to step S43 of FIG. 18.

When it is determined that the time read in step S55 is not longer than the average deployment time (step S57: No), the pre-deployment control unit 105 increments n by 1 (step S65). The process then returns to step S43 of FIG. 18.

As a result of the execution of the process, the scaling-out may be quickly completed when the VMs are insufficient. The VM deployed in advance is deleted when the VM does not operate, and wasteful consumption of the storage device of the host apparatus may be reduced. When the scaling-in is executed, the deletion of the VM and the deployment are executed only when the time from the scaling-in to the start of the scaling-out is longer than the deployment time. Therefore, execution of unwanted deletion and deployment may be reduced.

Second Embodiment

The situation of the use of VMs changes with time. Therefore, when old history data of auto-scaling is used, the average deployment time may be inappropriately calculated. Thus, the following process is executed in a second embodiment.

Figure 25:
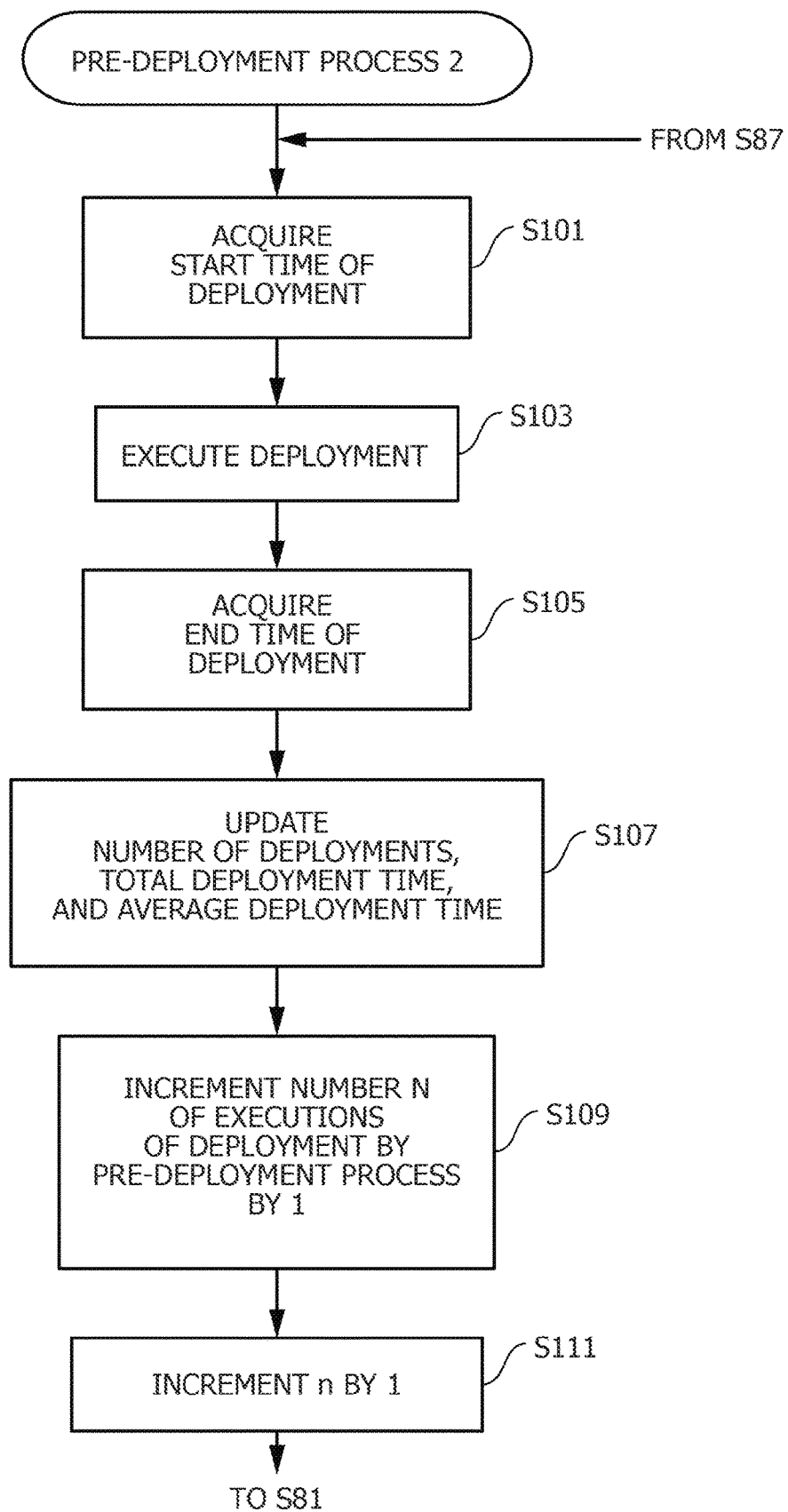
FIG. 25 is a flowchart illustrating a pre-deployment process in a second embodiment.

FIG. 25 illustrates a process of controlling the execution of the pre-deployment process in the second embodiment.

The second deployment unit 109 acquires information of the start time of the deployment (for example, the time point of the process of step S101) from, for example, the OS (step S101).

The second deployment unit 109 causes one of the host apparatuses 3a to 3c to execute the deployment (step S103).

For example, the second deployment unit 109 transmits a request for executing the deployment of one VM belonging to the target group to one of the host apparatuses 3a to 3c. The host apparatus that has received the request starts to write, to the HDD 33, the image file downloaded from, for example, an apparatus on the network.

Upon receiving the second deployment unit 109 a notification indicating the end of the deployment from the host apparatus, the second deployment unit 109 acquires information of the end time of the deployment (for example, the time point of the process of step S105) from, for example, the OS (step S105).

The second deployment unit 109 updates the number of deployments, the total deployment time, and the average deployment time stored in the deployment data storage unit 127 (step S107).

The second deployment unit 109 increments, by 1, the number N of executions of the deployment by the pre-deployment process (step S109). The number N is stored in the memory 12 or the HDD 13 in a format, for example, as illustrated in FIG. 26.

The second deployment unit 109 increments n by 1 (step S111). The process then moves to step S81 of FIG. 22. The process following step S81 is as described above, and the description will not be repeated.

Figure 27:
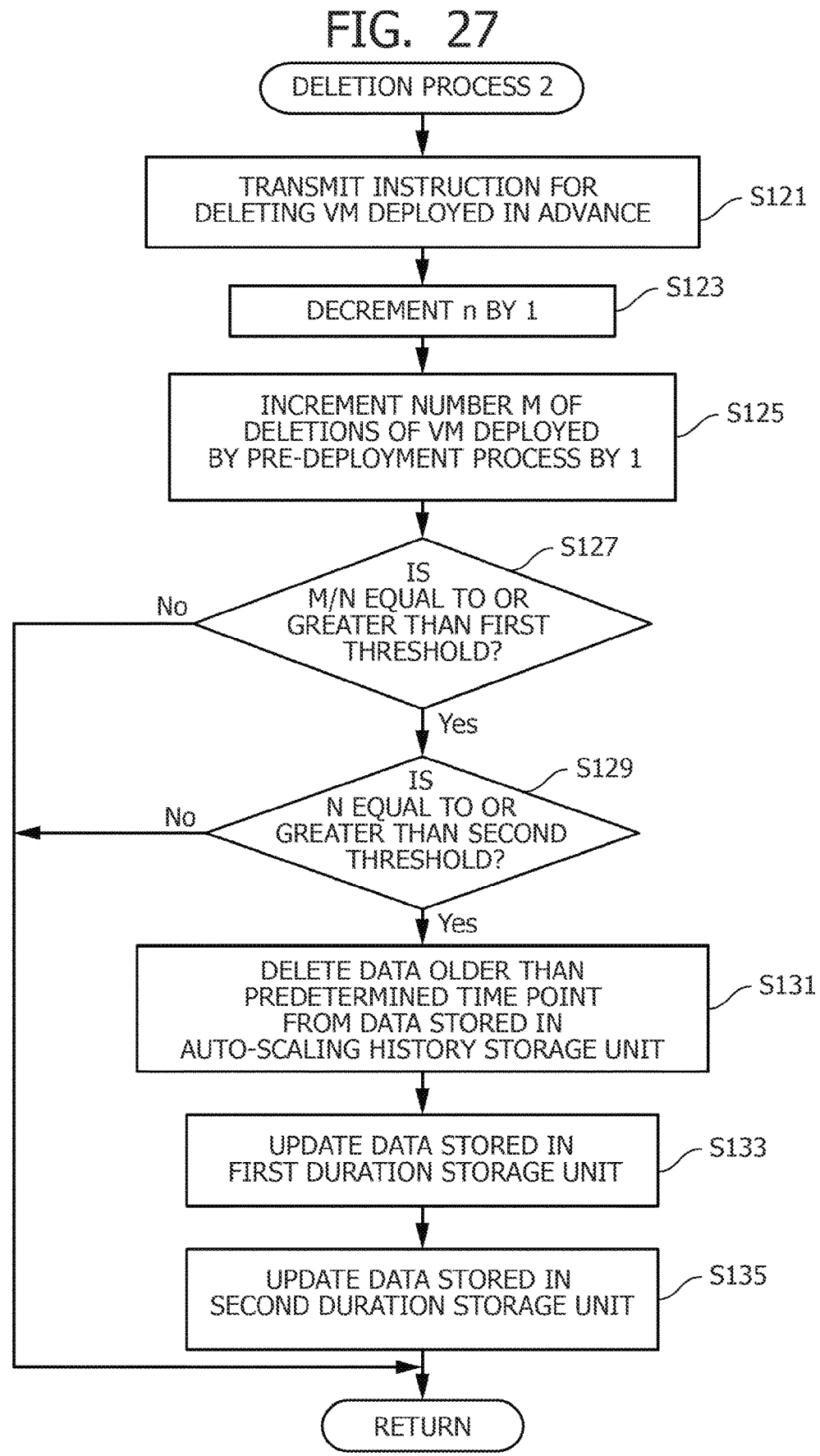
FIG. 27 is a flowchart illustrating a deletion process in a second embodiment.

FIG. 27 illustrates the deletion process in the second embodiment.

The VM management unit 111 transmits a request for deleting the VM deployed in the process of step S103 to the host apparatus that has deployed the VM in response to the request transmitted in step S103 (step S121). The host apparatus that has received the request for deleting the VM deletes the image file of the VM deployed in the process of step S103.

The VM management unit 111 decrements n by 1 (step S123).

The VM management unit 111 increments, by 1, the number M of deletions of the VM deployed by the pre-deployment process (step S125). The number M is stored in the memory 12 or the HDD 13 in a format, for example, as illustrated in FIG. 28.

The VM management unit 111 determines whether the value obtained by dividing M by N is equal to or greater than a first threshold (for example, 0.4) (step S127).

When it is determined that the value obtained by dividing M by N is not equal to or greater than the first threshold (step S127: No), the process returns to the caller.

When it is determined that the value obtained by dividing M by N is equal to or greater than the first threshold (step S127: Yes), the VM management unit 111 determines whether N is equal to or greater than a second threshold (for example, 200) (step S129).

When it is determined that N is not equal to or greater than the second threshold (step S129: No), the process returns to the caller.

When it is determined that N is equal to or greater than the second threshold (step S129: Yes), the VM management unit 111 deletes the data older than a predetermined time point (for example, time point prior to the current time by a predetermined time (for example, one week)) from the data stored in the auto-scaling history storage unit 123 (step S131).

The VM management unit 111 updates the data stored in the first duration storage unit 129 based on the data stored in the auto-scaling history storage unit 123 (step S133).

The VM management unit 111 updates the data stored in the second duration storage unit 131 based on the data stored in the auto-scaling history storage unit 123 (step S135). The process then returns to the caller.

As a result of the execution of the process, the deployment may be started at appropriate time even when, for example, the duration of the state is changed by the change in the situation of the use by the user.

Third Embodiment

The time for writing an image file to the HDD 33 may significantly vary depending on the type of image file. For example, the time for writing an image file of one type to the HDD 33 may be approximately three hours, and the time for writing an image file of another type to the HDD 33 may be approximately six hours. In such a case, the deployment time is preferably calculated for each image file.

Therefore, first group data as illustrated, for example, in FIG. 29 is stored in the group data storage unit 125 in a third embodiment. In the example of FIG. 29, identification information of a user, identification information of a group allocated to the user, and identification information of an image file for generating a VM belonging to the group are stored.

In the third embodiment, the deployment time is calculated for each image file. FIG. 30 illustrates an example of data stored in the deployment data storage unit 127 in the third embodiment. In the example of FIG. 30, the identification information of the image file, the number of deployments, the total deployment time, and the average deployment time are stored.

According to the configuration, the deployment may be started at appropriate time even when the deployment time significantly varies depending on the type of image file.

Fourth Embodiment

Although the management apparatus 1 is provided separately from the host apparatus in the first to third embodiments, the host apparatus may include the function of the management apparatus 1. FIG. 31 illustrates an exemplary functional configuration of the host apparatus 3a in a fourth embodiment. The VM 301a and the VM 302a operate in the host apparatus 3a, and the host apparatus 3a includes a management unit 30. The management unit 30 includes the function of the management apparatus 1 in either one of the first to third embodiments. Although two VMs operate in the host apparatus 3a in the example of FIG. 31, three or more VMs may operate. The functional configurations of the host apparatuses 3b and 3c may be similar to the functional configuration of the host apparatus 3a.

According to the configuration, the operation may be carried out without preparing the management apparatus 1 separately from the host apparatuses 3a to 3c.

Although the embodiments have been described, embodiments are not limited to these disclosures. For example, the functional configuration of the management apparatus 1 described above may be different from the actual program module configuration.

The configuration of each table described above is an example, and the configuration may be different from the configuration described above. The order of processes may be switched as long as the processing results do not change. The processes may also be executed in parallel if possible.

Although the image file is used to generate the VM in the embodiments, a snapshot may be used to generate the VM.

The embodiments described above are as follows.

An information processing apparatus according to the embodiments includes: (A) a first identification unit that identifies a predicted time point of starting scaling-out in another information processing apparatus in which at least one virtual machine operates, based on history data of auto-scaling executed by the another information processing apparatus (the first setting unit 1131 in the embodiments is an example of the first identification unit); (B) a second identification unit that identifies a required time of deployment executed by the another information processing apparatus based on data of a past start time and a past end time of the deployment (the second setting unit 1132 in the embodiments is an example of the second identification unit); (C) a determination unit that determines a next start time of starting the deployment by the another information processing apparatus based on the identified predicted time and the identified required time (the third setting unit 1133 in the embodiments is an example of the determination unit); and (D) a deployment unit that transmits, to the another information processing apparatus, a first request for starting the deployment by the another information processing apparatus, at the determined next start time (the second deployment unit 109 in the embodiments is an example of the deployment unit).

The information processing apparatus may start the time-consuming deployment before the scaling-out is started in the another information processing apparatus. Therefore, the scaling-out may be quickly completed when virtual machines are insufficient.

The information processing apparatus may further include (E) a deletion unit that transmits a second request for deleting a virtual machine deployed in response to the first request to the another information processing apparatus when the scaling-out is not started by the another information processing apparatus after a predetermined time from the predicted time (the VM management unit 111 in the embodiments is an example of the deletion unit).

As a result, the information processing apparatus may use the resources (for example, storage devices) once prepared for the deployed virtual machines in other uses.

The deletion unit may further (e1) delete part of the history data older than a predetermined time when a ratio of the number of virtual machines deleted in response to the second request to the number of virtual machines deployed in response to the first request is equal to or greater than a predetermined value.

As a result, the information processing apparatus may follow changes of the execution timing and the like of the scaling-out.

The information processing apparatus may further include (F) a calculation unit that calculates a time from execution of past scaling-in to a start of past scaling-out based on the history data (the auto-scaling control unit 103 in the embodiments is an example of the calculation unit). The deletion unit may (e2) transmit a third request for deleting the virtual machine deployed in the another information processing apparatus when the scaling-in is started in the another information processing apparatus and the time calculated by the calculation unit is longer than the required time of deployment.

As a result, the information processing apparatus may reduce wasteful deletion of the virtual machines.

The first identification unit may further (a1) identify the predicted time based on an average time from completion of auto-scaling to a start of next auto-scaling.

The start time may be a time point more than the required time prior to the predicted time.

This increases the possibility that the information processing apparatus will start the scaling-out at the completion of the deployment.

The second identification unit may further (b1) identify the required time for each type of deployed virtual machine.

As a result, the information processing apparatus may identify a more appropriate required time.

An information processing system according to the embodiments includes: (G) a first information processing apparatus in which at least one virtual machine operates; and (H) a second information processing apparatus. The second information processing apparatus includes: (h1) a first identification unit that identifies a predicted time point of starting scaling-out in the first information processing apparatus based on history data of auto-scaling executed by the first information processing apparatus (the first setting unit 1131 in the embodiments is an example of the first identification unit); (h2) a second identification unit that identifies a required time of deployment executed by the first information processing apparatus based on data of a past start time and a past end time of the deployment (the second setting unit 1132 in the embodiments is an example of the second identification unit); (h3) a determination unit that determines a next start time of starting the deployment by the first information processing apparatus based on the identified predicted time and the identified required time (the third setting unit 1133 in the embodiments is an example of the determination unit); and (h4) a deployment unit that transmits, to the first information processing apparatus, a first request for starting the deployment by the first information processing apparatus, at the determined next start time (the second deployment unit 109 in the embodiments is an example of the deployment unit).

An information processing method according to the embodiments includes a process including: (I) identifying a predicted time point of starting scaling-out in an information processing apparatus in which at least one virtual machine operates, based on history data of auto-scaling executed by the information processing apparatus; (J) identifying a required time of deployment executed by the information processing apparatus based on data of a past start time and a past end time of the deployment; (K) determining a next start time of starting the deployment by the information processing apparatus based on the identified predicted time and the identified required time; and (L) transmitting, to the information processing apparatus, a first request for starting the deployment by the information processing apparatus at the determined next start time.

Note that a program for causing a processor to execute the process in the method may be created, and the program is stored in a computer-readable storage medium or a storage device, such as a flexible disk, a compact disk read-only memory (CD-ROM), a magneto-optical disk, a semiconductor memory, and a hard disk. Note that intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A management apparatus comprising:
   a memory; and
   a processor coupled to the memory and the processor configured to:
   identify a predicted time point of starting scaling-out in an information processing apparatus in which at least one virtual machine operates, based on history data of auto-scaling executed by the information processing apparatus, the scaling-out being a process of increasing a number of the at least one virtual machine, the auto-scaling including the scaling-out and scaling-in, the scaling-in being a process of decreasing the number of the at least one virtual machine;
   identify a required time of deployment executed by the information processing apparatus based on data of a past start time and a past end time of the deployment, the deployment being a process of preparing a virtual machine in the information processing apparatus;
   determine a next start time of starting the deployment by the information processing apparatus based on the identified predicted time and the identified required time;
   transmit at the next start time, to the information processing apparatus, a first request for starting the deployment by the information processing apparatus; and
   transmit a second request for deleting a virtual machine deployed in response to the first request to the information processing apparatus when the scaling-out is not started by the information processing apparatus after a predetermined time from the predicted time.

2. The management apparatus according to claim 1, wherein the processor is further configured to delete part of the history data older than predetermined time when a ratio of a number of virtual machines deleted in response to the second request to a number of virtual machines deployed in response to the first request is equal to or greater than a predetermined value.

3. The management apparatus according to claim 1, wherein the processor is further configured to:
   calculate a time from execution of past scaling-in to a start of past scaling-out based on the history data; and
   transmit a third request for deleting the virtual machine deployed in the information processing apparatus when the scaling-in is started in the information processing apparatus and when the calculated time is longer than the required time.

4. The management apparatus according to claim 1, wherein the processor is further configured to identify the predicted time based on an average time from completion of auto-scaling to a start of following auto-scaling.

5. The management apparatus according to claim 1, wherein the start time is a time point more than the required time prior to the predicted time.

6. The management apparatus according to claim 1, wherein the processor is further configured to identify the required time for each type of deployed virtual machine.

7. An information processing system comprising:
   a first information processing apparatus including:
   a first memory; and
   a first processor coupled to the first memory and the first processor configured to operate at least one virtual machine; and a second information processing apparatus including:
a second memory; and
a second processor coupled to the second memory and the second processor configured to:
identify a predicted time point of starting scaling-out in the first information processing apparatus based on history data of auto-scaling executed by the first information processing apparatus, the scaling-out being a process of increasing a number of the at least one virtual machine, the auto-scaling including the scaling-out and scaling-in, the scaling-in being a process of decreasing the number of the at least one virtual machine;
identify a required time of deployment executed by the first information processing apparatus based on data of a past start time and a past end time of the deployment, the deployment being a process of preparing a virtual machine in the first information processing apparatus;
determine a next start time of starting the deployment by the first information processing apparatus based on the identified predicted time and the identified required time;
transmit at the next start time, to the first information processing apparatus, a first request for starting the deployment by the first information processing apparatus; and
transmit a second request for deleting a virtual machine deployed in response to the first request to the information processing apparatus when the scaling-out is not started by the information processing apparatus after a predetermined time from the predicted time.

8. A non-transitory computer-readable recording medium having stored therein a program that causes a computer to execute a process, the process comprising:
identifying a predicted time point of starting scaling-out in an information processing apparatus in which at least one virtual machine operates, based on history data of auto-scaling executed by the information processing apparatus, the scaling-out being a process of increasing a number of the at least one virtual machine, the auto-scaling including the scaling-out and scaling-in, the scaling-in being a process of decreasing the number of the at least one virtual machine;
identifying a required time of deployment executed by the information processing apparatus based on data of a past start time and a past end time of the deployment, the deployment being a process of preparing a virtual machine in the information processing apparatus;
determining a next start time of starting the deployment by the information processing apparatus based on the identified predicted time and the identified required time;
transmitting at the next start time, to the information processing apparatus, a first request for starting the deployment by the information processing apparatus; and
transmit a second request for deleting a virtual machine deployed in response to the first request to the information processing apparatus when the scaling-out is not started by the information processing apparatus after a predetermined time from the predicted time.

* * * * *